(12) United States Patent
Wang et al.

(10) Patent No.: US 12,106,481 B2
(45) Date of Patent: Oct. 1, 2024

(54) COMPUTER VISION SYSTEMS AND METHODS FOR END-TO-END TRAINING OF CONVOLUTIONAL NEURAL NETWORKS USING DIFFERENTIABLE DUAL-DECOMPOSITION TECHNIQUES

(71) Applicant: Insurance Services Office, Inc., Jersey City, NJ (US)

(72) Inventors: Shaofei Wang, Philadelphia, PA (US); Vishnu Sai Rao Suresh Lokhande, Madison, WI (US); Maneesh Kumar Singh, Princeton, NJ (US); Konrad Kording, Philadelphia, PA (US); Julian Yarkony, Jersey City, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 829 days.

(21) Appl. No.: 17/121,257

(22) Filed: Dec. 14, 2020

(65) Prior Publication Data

US 2021/0182675 A1    Jun. 17, 2021

Related U.S. Application Data

(60) Provisional application No. 62/947,874, filed on Dec. 13, 2019.

(51) Int. Cl.
| | |
|---|---|
| *G06T 7/10* | (2017.01) |
| *G06F 18/20* | (2023.01) |
| *G06F 18/21* | (2023.01) |
| *G06N 3/08* | (2023.01) |
| *G06N 5/046* | (2023.01) |

(Continued)

(52) U.S. Cl.
CPC ............ *G06T 7/10* (2017.01); *G06F 18/2163* (2023.01); *G06F 18/29* (2023.01); *G06N 3/08* (2013.01); *G06N 5/046* (2013.01); *G06T 7/11* (2017.01); *G06V 10/26* (2022.01); *G06V 10/85* (2022.01); *G06V 30/19153* (2022.01);
(Continued)

(58) Field of Classification Search
CPC . G06N 3/08; G06N 5/046; G06T 7/10; G06T 7/11; G06T 2207/20081; G06T 2207/20084; G06V 30/274; G06V 30/19153; G06V 10/26; G06V 10/85; G06F 18/29; G06F 18/2163
See application file for complete search history.

(56) References Cited

U.S. PATENT DOCUMENTS

2018/0253622 A1\*  9/2018  Chen ........................ G06N 3/08

OTHER PUBLICATIONS

Wang, et al. (computer English translation of Chinese patent No. CN108305266A), pp. 1-10. (Year: 2018).\*

(Continued)

*Primary Examiner* — Daniel G Mariam
(74) *Attorney, Agent, or Firm* — McCarter & English, LLP

(57) ABSTRACT

Computer vision systems and methods for end-to end training of neural networks are provided. The system generates a fixed point algorithm for dual-decomposition of a maximum-a-posteriori inference problem and trains the convolutional neural network and a conditional random field with the fixed point algorithm and a plurality of images of a dataset to learn to perform semantic image segmentation. The system can segment an attribute of an image of the dataset by the trained neural network and the conditional random field.

18 Claims, 14 Drawing Sheets

(51) Int. Cl.
  G06T 7/11      (2017.01)
  G06V 10/26     (2022.01)
  G06V 10/84     (2022.01)
  G06V 30/19     (2022.01)
  G06V 30/262    (2022.01)
(52) U.S. Cl.
  CPC .. *G06V 30/274* (2022.01); *G06T 2207/20081* (2013.01); *G06T 2207/20084* (2013.01)

(56) References Cited

OTHER PUBLICATIONS

Vemulapalli, et al. (Gaussian Conditional Random Field Network for Semantic Segmentation), pp. 3224-3233 (Year: 2016).*
Knöbelreiter, et al. (End-to-End Training of Hybrid CNN-CRF Models for Stereo), pp. 1456-1465 (Year: 2017).*
Teichmann, et al. (Convolutional CRFs for Semantic Segmentation), pp. 1-12. (Year: 2018).*
Wang, et al., "End-to-End Training of CNN-CRF via Differentiable Dual-Decomposition," arXiv:1912.02937v1, Dec. 6, 2019 (14 pages).
Mensch, et al., "Differentiable Dynamic Programming for Structured Prediction and Attention," Proceedings of the 35th International Conference on Machine Learning (2018) (10 pages).
Belanger, et al., "End-to-End Learning for Structured Prediction Energy Networks," Proceedings of the 34th International Conference on Machine Learning (2017) (11 pages).
Chen, et al., "Rethinking Atrous Convolution for Semantic Image Segmentation," arXiv:1706.05587v3, Dec. 5, 2017 (14 pages).
Chollet, et al., "Xception: Deep Learning with Depthwise Separable Convolutions," Proceedings of CVPR (2017) (8 pages).
Domke, "Dual Decomposition for Marginal Inference," Proceedings of the 25th AAAI Conference on Artificial Intelligence (2011) (6 pages).
Finley, et al. "Training Structural SVMs When Exact Inference is Intractable," Proceedings of the 25th International Conference on Machine Learning (2008) (8 pages).
Globerson, et al., "Fixing Max-Product: Convergent Message Passing Algorithms for MAP LP-Relaxations," Proceedings of NIPS (2008) (8 pages).
Hariharan, et al., "Semantic Contours from Inverse Detectors," 2011 IEEE International Conference on Computer Vision (8 pages).
Jancsary, et al., "Convergent Decomposition Solvers for Tree-Reweighted Free Energies," Proceedings of the 14th International Conference on Artificial Intelligence and Statistics (2011) (11pages).
He, et al., "Deep Residual Learning for Image Recognition," Proceedings of CVPR (2016) (9 pages).
Kolmogorov, et al., "Convergent Tree-Reweighted Message Passing for Energy Minimization," IEEE Transactions on Pattern Analysis and Machine Intelligence, vol. 28, No. 10, Oct. 2006 (16 pages).
Komodakis, et al., "Efficient Training for Pairwise or Higher Order CRFs Via Dual Decomposition," Proceedings of CVPR (2011) (8 pages).
Komodakis, et al., "MRF Optimization via Dual Decomposition: Message-Passing Revisited," Proceedings of ICCV (2007) (8 pages).
Krahenbuhl, et al., "Efficient Inference in Fully Connected CRFs with Gaussian Edge Potentials," Proceedings of NIPS (2011) (9 pages).
Chen, et al., "Learning Deep Structured Models," Proceedings of the 32nd International Conference on Machine Learning (2015) (10 pages).
Lin, et al., "Efficient Piecewise Training of Deep Structured Models for Semantic Segmentation," Proceedings of CVPR (2016) (10 pages).
Liu, et al., "Deep Learning Markov Random Field for Semantic Segmentation," IEEE Transactions on Pattern Analysis and Machine Intelligence, vol. 40, No. 8, Aug. 2018 (15 pages).
Wainwright, et al., "A New Class of Upper Bounds on the Log Partition Function," IEEE Transactions on Information Theory, vol. 51, No. 7, Jul. 2005 (23 pages).
Paszke, et al., "Automatic Differentiation in PyTorch," 31st Conference on Neural Informational Processing Systems (2017) (4 pages).
Shimony, "Finding MAPs for Belief Networks is NP-hard," Artificial Intelligence 68 (1994) (12 pages).
Song, et al., "End-to-End Learning for Graph Decomposition," Proceedings of ICCV (2019) (10 pages).
Sontag, et al., "Introduction to Dual Decomposition for Inference," Optimization for Machine Learning, (2011) (37 pages).
Sontag, et al., "Tree Block Coordinate Descent for MAP in Graphical Models," Proceedings of the 12th International Conference on Artificial Intelligence and Statistics (2009) (8 pages).
Meltzer, et al., "Convergent Message Passing Algorithms: A Unifying View," Proceedings of UAI (2009) (9 pages).
Tsochantaridis, et al., "Large Margin Methods for Structured and Interdependent Output Variables," Journal of Machine Learning Research (2005) (32 pages).
Wang, et al., "Non-Local Neural Networks," Proceedings of CVPR (2018) (10 pages).
Yarkony, et al., "Covering Trees and Lower-Bounds on Quadratic Assignment," Proceedings of CVPR (2010) (8 pages).
Zheng, et al., "Conditional Random Fields as Recurrent Neural Networks," arXiv:1502.03240v2, Apr. 30, 2015 (16 pages).
Huang, et al., "CCnet: Criss-Cross Attention for Semantic Segmentation," Proceedings of ICCV (2019) (10 pages).
The PASCAL Visual Object Classes Challenge 2012 (VOC2012), http://host.robots.ox.ac.uk/pascal/VOC/voc2012/ (11 pages).
Everingham, et al., "The PASCAL Visual Object Classes Challenge: A Retrospective," International Journal of Computer Vision (2015) (39 pages).

* cited by examiner

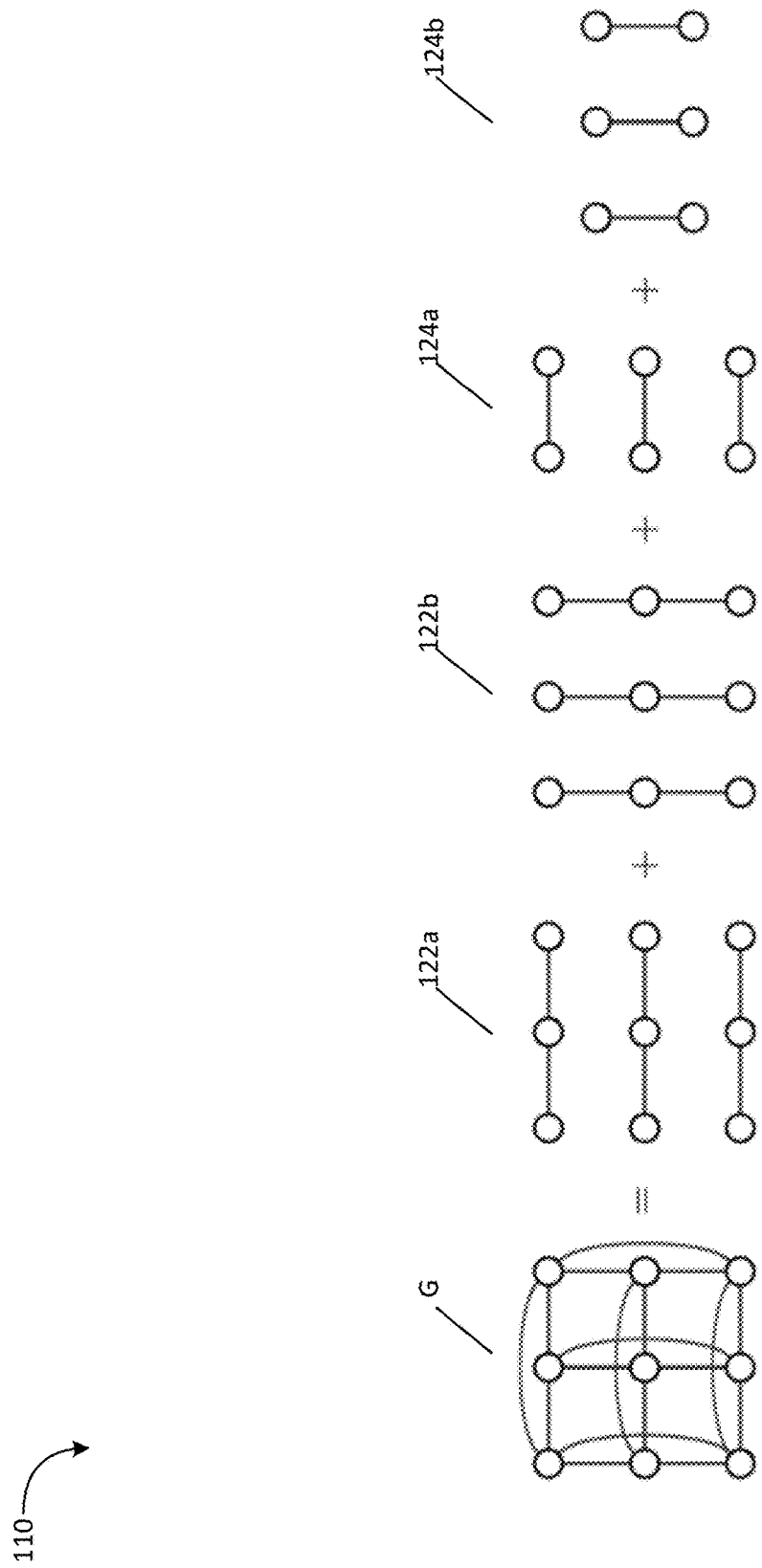

130

---

Algorithm 1 Fixed-point Algorithm for Dual-Decomposition

---

1: Initialize $\{\phi^t, \psi^t\}$ according to Eq. (9)
2: Positive step-size $\alpha = \frac{1}{\max_{t \in \mathcal{T}} |V^t|}$
3: repeat
4:   for $t \in \mathcal{T}$ do
5:     for $l \in 1, \ldots, L$ do
6:       Compute max-marginal via dyamic programming of state $l$ of vertex $i$ in tree $t$ as $\mu_i^t(l)$
7:     end for
8:     Compute optimizing state that minimizes $\mu_i^t$ as $x_i^{t*}$
9:   end for
10:   for $t \in \mathcal{T}$ do
11:     for $l \in 1, \ldots, L$ do
12:       $\psi_i^t(l) \leftarrow \psi_i^t(l) - \alpha(\mu_i^t(l) - \frac{1}{|\mathcal{T}(i)|} \sum_{\bar{t} \in \mathcal{T}(i)} \mu_i^{\bar{t}}(l))$
13:     end for
14:   end for
15: until $x_i^{t*} = x_i^{\bar{t}*}, \forall i \in V, \forall (t, \bar{t}) \in \mathcal{T}(i) \times \mathcal{T}(i)$

| Method | Backbone | #+Params | mIoU |
|---|---|---|---|
| baseline-block4 | ResNet-50 | 1.6M | 64.3 |
| +System 10 (15FPI) | ResNet-50 | 1.8M | 68.6 |
| +ASPP | ResNet-50 | 14.8M | 73.8 |
| +ASPP+ System 10 (5FPI) | ResNet-50 | 15.0M | 74.4 |
| +ASPP | Xception-65 | 14.8M | 77.8 |
| +ASPP+ System 10 (15FPI) | Xception-65 | 15.0M | 78.0 |

COMPUTER VISION SYSTEMS AND METHODS FOR END-TO-END TRAINING OF CONVOLUTIONAL NEURAL NETWORKS USING DIFFERENTIABLE DUAL-DECOMPOSITION TECHNIQUES

RELATED APPLICATIONS

This application claims priority to U.S. Provisional Patent Application Ser. No. 62/947,874 filed on Dec. 13, 2019, the entire disclosure of which is hereby expressly incorporated by reference.

BACKGROUND

Field of the Disclosure

The present disclosure relates generally to the field of computer vision. More specifically, the present disclosure relates to computer vision systems and methods for end-to-end training of convolutional neural networks using differentiable dual-decomposition techniques.

Related Art

Modern computer vision approaches generally utilize convolutional neural networks (CNNs) that excel at hierarchal feature extraction. Conventional computer vision approaches generally utilize conditional random fields (CRFs) that excel at modeling flexible higher order interactions. The benefits of CNNs and CRFs are complementary, and as such, are often combined. However, these approaches generally utilize a mean-field (MF) approximation technique which does not directly optimize a real problem.

Therefore, there is a need for computer vision systems and methods which can utilize a deep network architecture to provide an alternative to the MF approximation technique for dual-decomposition base approaches to CRF optimization while improving the ability of computer systems to more efficiently process data. These and other needs are addressed by the computer vision systems and methods of the present disclosure.

SUMMARY

The present disclosure relates to computer vision systems and methods for end-to-end training of convolutional neural networks using differentiable dual-decomposition techniques. In particular, the system allows for segmenting an attribute of an image using a convolutional neural network and a conditional random field that learn to perform semantic image segmentation. Additionally, the system trains the convolutional neural network and the conditional random field using a fixed point algorithm for dual-decomposition and a plurality of images of a dataset.

BRIEF DESCRIPTION OF THE DRAWINGS

The foregoing features of the disclosure will be apparent from the following Detailed Description, taken in connection with the accompanying drawings, in which:

FIG. 5 is a diagram illustrating decomposition processing carried out by the system of the present disclosure according to step 96 of FIG. 4;

FIG. 6 is a diagram illustrating a fixed-point algorithm for dual-decomposition implemented by the system of the present disclosure;

FIG. 10 is a diagram illustrating an algorithm for implementing forward and backward passes for determining smoothed-max-marginals and their gradients;

FIG. 11 is a diagram illustrating an algorithm for implementing forward and backward passes for determining max-marginals and their gradients;

FIG. 13 is a table illustrating quantitative processing results based on different network models.

DETAILED DESCRIPTION

Figure 1:
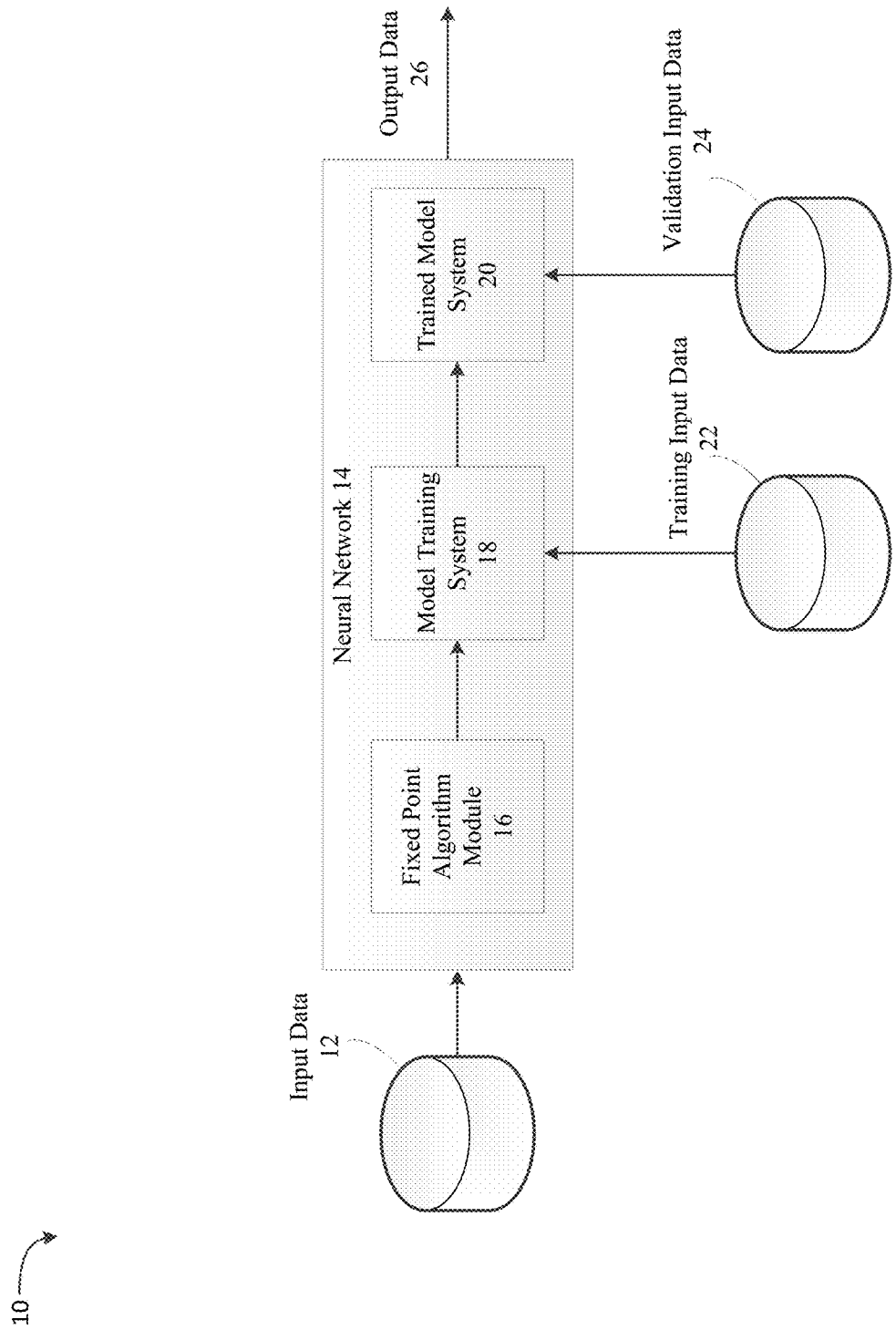
FIG. 1 is a diagram illustrating an embodiment of the system of the present disclosure.

The present disclosure relates to computer vision systems and methods for end-to-end training of convolutional neural networks using differentiable dual-decomposition, as discussed in detail below in connection with FIGS. 1-14.

End-to-end training of combined convolutional neural networks (CNNs) and conditional random fields (CRFs) generally improves quality in pixel labeling tasks in comparison with decoupled training. Conventional end-to-end trainable systems are generally based on a mean-field (MF) approximation to the CRF. The MF approximation approximates a posterior distribution of a CRF via a set of variational distributions, which are of simple forms and amendable to an analytical solution. This approximation is utilized in end-to-end trainable frameworks where the CRF is combined with a CNN because MF iterations can be unrolled as a set of recurrent convolutional and arithmetic layers and thus is fully differentiable.

However, despite computational efficiency and straight forward implementation, MF based approaches suffer from the assumptions that the underlying latent variables are independent and that the variational distributions are simple. Accordingly, an exact maximum-a-posteriori (MAP) solution of a CRF cannot be realized with MF iterations because in practical CRFs latent variables are generally not independent and posterior distributions are complex and cannot be analytically expressed. For example, to employ an efficient inference, a known approach can model pairwise potentials as a weighted sum of a set of Gaussian kernels over pairs of feature vectors which penalizes or yields a very small boost to dissimilar feature vectors and therefore tends to smooth-out pixel labels spatially. Alternatively, a more general pairwise model can encourage an assignment of different labels to a pair of dissimilar feature vectors, if they actually belong to different semantic classes in ground-truth.

The system of the present disclosure describes a dual-decomposition solution to MAP inference of a Markov random field (MRF). It should be understood that a CRF can be considered as an MRF conditioned on input data and therefore inference methods on an MRF are applicable to a CRF if input data and potential functions are fixed per inference. Dual-decomposition does not make assumptions about a distribution of a CRF but instead formulates the MAP inference problem as an energy maximization problem. Directly solving this problem on a graph with cycles is generally nondeterministic polynomial time (NP) hard. However, dual-decomposition relaxes the original problem by decomposing the graph into a set of trees that cover each edge and vertex at least once such that MAP inferences on these tree-structured sub-problems can be executed efficiently via dynamic programming while the solution to the original problem can be realized via dual-coordinate descent or sub-gradient descent utilizing solutions from the sub-problems. Dual decomposition is considered to be an approximate algorithm in that it can minimize a convex upper bound of an original problem and the solutions of the sub-problems do not necessarily agree with each other. However, the approximate primal objective can be realized via heuristic decoding at any time during optimization. Further, the duality-gap describes a quality of the current solution such that a gap of zero yields an optimal solution. In contrast, the MF approximation only yields a local minimum of the Kullback Leibler (KL) divergence.

With respect to learning parameters for CNNs and CRFs, the MF approximation is fully differentiable and therefore trainable with back-propagation. Known dual-decomposition approaches rely on sub-gradient descent or dual-coordinate-descent to maximize the energy objectives and therefore are not immediately differentiable with respect to CNN parameters that generate CRF potentials. Max-margin learning is generally utilized in such a situation for linear and non-linear deep neural network models. However, these models require that the MAP inference routine be sufficiently robust to determine reasonable margin violators to enable learning. This can be problematic when the underlying CRF potentials are parameterized by non-linear and complex CNNs instead of linear classifiers as in traditional max-margin frameworks (e.g., a structured support vector machine (SVM)). In contrast, the fixed-point iteration of the system of the present disclosure is derived from a special case of more general block coordinate descent algorithms and optimizes the CRF energy directly with respect to the CRF potentials and thus can be jointly trained with CNNs via back-propagation. Additionally, instead of employing a gradient predictor for MAP inference which can provide minimal theoretical guarantees, the system of the present disclosure derives a differentiable dual-decomposition algorithm for MAP inference including properties such as dual-monotonicity and provable optimality.

The systems and methods of the present disclosure derive a fixed-point algorithm having dual-monotonicity and dual-differentiability based on dual-decomposition that overcomes the aforementioned problems. In particular, a smoothed-max operator with negative-entropy regularization provides for the fixed-point algorithm to be fully-differentiable while remaining monotone for the dual objective. Additionally, the system provides an efficient and highly parallel graphics processing unit implementation for the algorithm. Accordingly, the system of the present disclosure can perform end-to-end training of CNNs and CRFs by differentiating through dual-composition layers thereby improving semantic segmentation accuracy on the PASCAL Visual Object Classes (VOC) 2012 dataset over baseline models.

Turning to the drawings, FIG. 1 is a diagram 10 illustrating an embodiment of the system 10 of the present disclosure. The system 10 includes a neural network 14 which receives input data 12 and includes a fixed point algorithm module 16, a model training system 18, and a trained model system 20. The neural network 14 also receives training input data 22 and validation input data 24, and outputs output data 26. The neural network 14 can be any type of neural network or machine learning system, or combination thereof, modified in accordance with the present disclosure to include the components shown and described herein. For example, the neural network 14 can be a deep convolutional neural network combined with a conditional random field and capable of, for example, semantic image segmentation and can use one or more frameworks (e.g., interfaces, libraries, tools, etc.). It should be understood that the neural network 14 can include the fixed point algorithm module 16 as a layer of the neural network 14.

Figure 2:
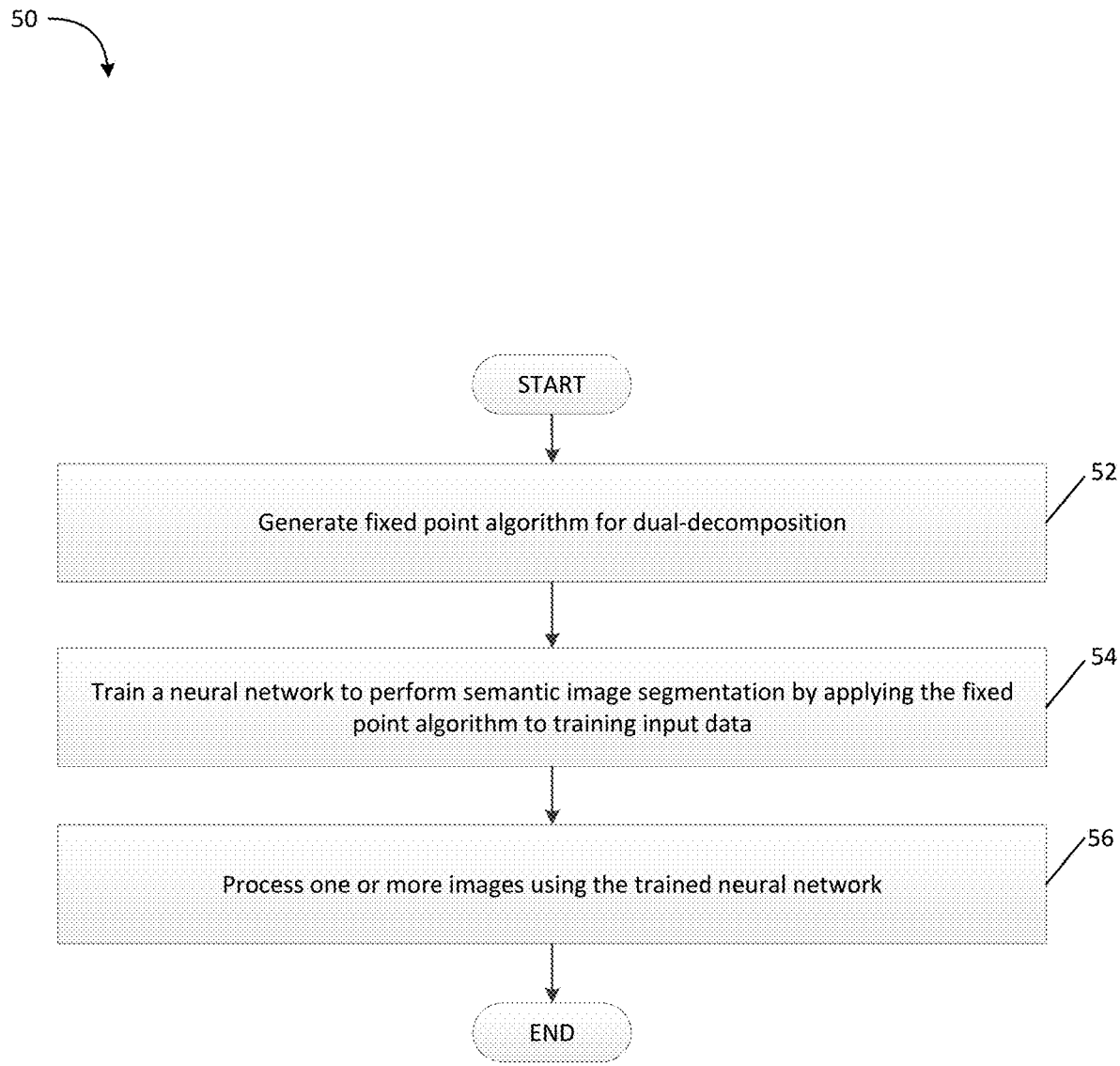
FIG. 2 is a flowchart illustrating overall processing steps carried out by the system of the present disclosure.

FIG. 2 is a flowchart 50 illustrating overall processing steps carried out by the system 10 of the present disclosure. Beginning in step 52, the fixed point algorithm module 16 implements a monotone fixed point algorithm for dual-decomposition. As mentioned above, the algorithm is a differentiable dual-composition algorithm for MAP inference having theoretical properties such as dual-monotonicity and provable optimality. In step 54, the model training system 18 trains the neural network 14 by applying the fixed point algorithm on the training input data 22. In particular, the model training system 18 trains the neural network 14 to perform semantic image segmentation. The training input data 22 can include, but is not limited to, a predetermined number of images. In this regard, it is noted that the training input data 22 can be a set of images upon which a semantic segmentation task will be performed, such as the PASCAL VOC 2012 data set. It should be understood that the neural network 14 can be any type of neural network or machine learning system, or combination thereof. Then, in step 56, the trained model system 20 processes validation input data 24 to perform semantic image segmentation. The validation input data 24 can include, but is not limited to, a predetermined number of images, such as (but not limited to) the PASCAL VOC 2012 data set.

Figure 3:
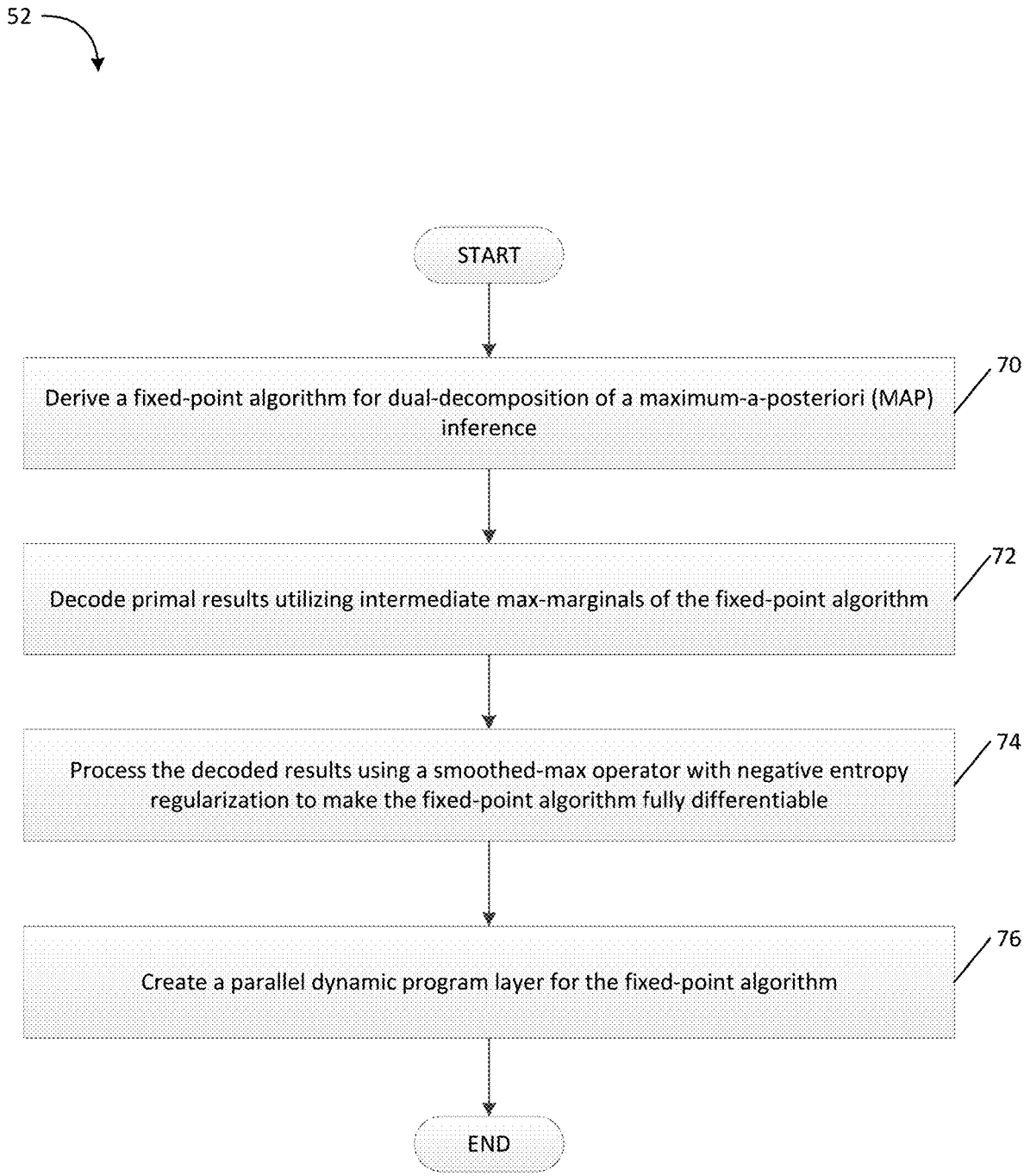
FIG. 3 is a flowchart illustrating step 52 of FIG. 2 in greater detail.

FIG. 3 is a flowchart illustrating step 52 of FIG. 2 in greater detail. Beginning in step 70, the system 10 derives a fixed-point algorithm for dual-decomposition of a MAP inference problem. Then, in step 72, the system 10 decodes primal results utilizing some intermediate max-marginals $\{\mu^t\}$ with $\{x^{t*}\}$ of the fixed-point algorithm where the intermediate max-marginals $\{\mu^t\}$ with $\{x^{t*}\}$ do not necessarily agree on each other. In step 74, the system 10 processes the decoded results using a smoothed-max operator with negative entropy regularization to make the fixed-point algorithm fully differentiable. The forward pass is a log-sum-exp operator while the backward pass is a soft-max operator. Lastly, in step 76, the system 10 creates a parallel dynamic program layer for the fixed-point algorithm to compute horizontal/vertical marginals on a pixel grid (as shown in line 6 of the fixed-point algorithm for dual-decomposition of FIG. 6).

Figure 4:
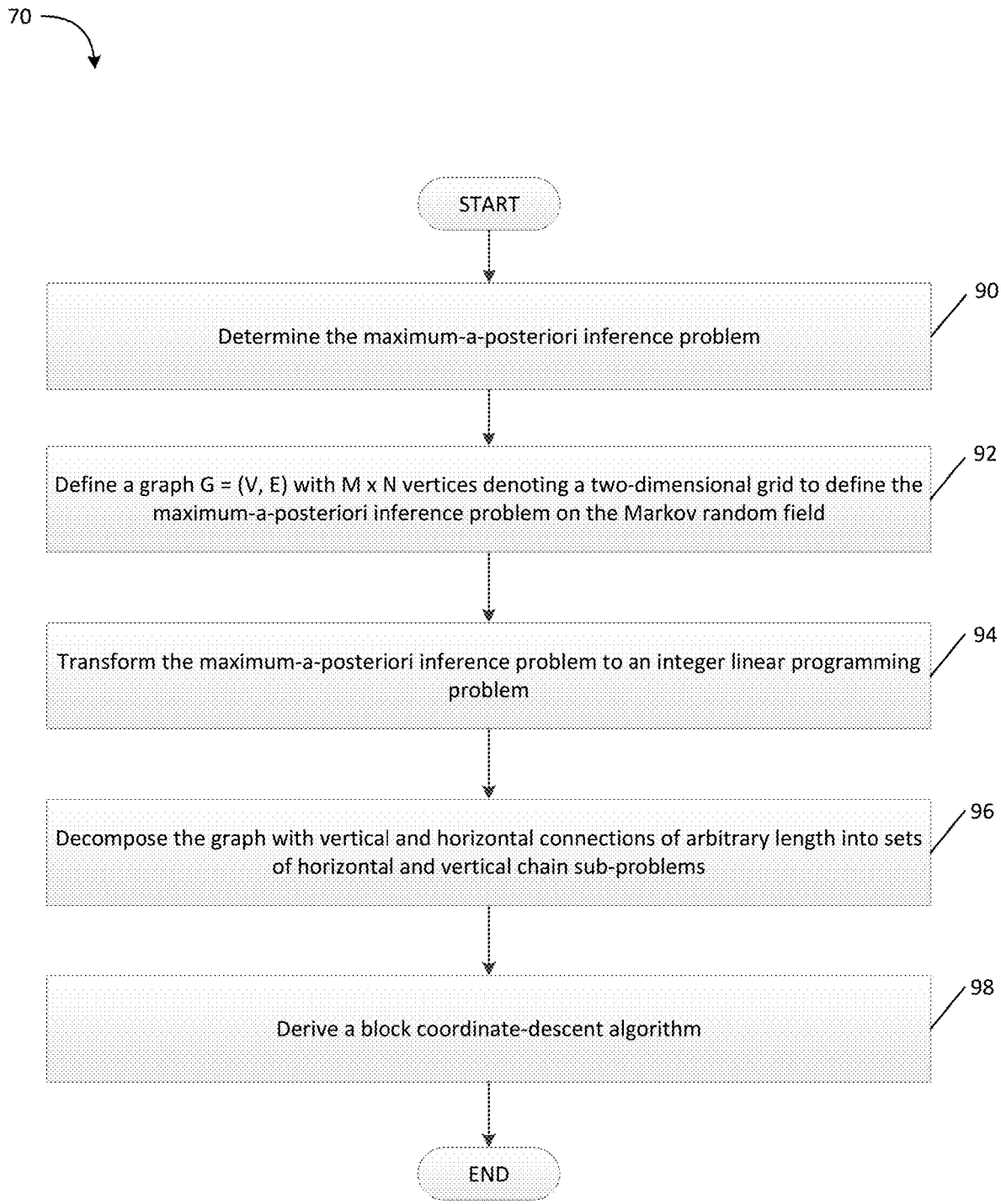
FIG. 4 is a flowchart illustrating step 70 of FIG. 3 in greater detail.

FIG. 4 is a flowchart illustrating step 70 of FIG. 3 in greater detail. Beginning in step 100, the system 10 determines the MAP inference problem. The system 10 performs per-pixel labeling on an image $\mathcal{I}$ with a size M×N to produce a label $l \in \mathcal{L}$ for each pixel in the image $\mathcal{I}$ (e.g., semantic classes or disparity). A CRF endeavors to model a conditional distribution $P(L|\mathcal{I})$ with $L \in \mathcal{L}^{|M \times N|}$. When modeled jointly with a CNN $f$ parameterized by $\theta$, the conditional distribution is defined by Equation 1 below as:

$$P(L \mid \mathcal{I}) = \frac{1}{Z}\exp(f_\theta(L; \mathcal{I})) \qquad \text{Equation 1}$$

where $Z = \Sigma_{L \in \mathcal{L}^{|M \times N|}}\exp(f_\theta(L; \mathcal{I}))$ is a normalizing constant that does not depend on L. It should be understood that the system 10 considers pairwise potential functions defined by Equation 2 below as:

$$f_\theta(L; \mathcal{I}) = \sum_{i \in V} \psi_\theta(l_i; \mathcal{I}) + \sum_{ij \in E} \phi_\theta(l_i, l_j; \mathcal{I}) \qquad \text{Equation 2}$$

where $\psi(\cdot)$ and $\phi(\cdot,\cdot)$ are neural networks modeling unary and pairwise potential functions. V denotes the set of all pixel locations and E denotes the pairwise edges in the graph. Determining the mode (or a maximum of the modes in a multi modal case) of the posterior distribution of Equation 1 is equivalent to determining the maximizing configuration L* of L to Equation 2 as given by Equation 3 and Equation 4 below:

$$L^* = \underset{L}{\operatorname{argmax}} f_\theta(L; \mathcal{I}) \qquad \text{Equation 3}$$

$$P(L^* \mid \mathcal{I}) = \frac{1}{Z}\exp\left(\max_L f_\theta(L; \mathcal{I})\right) \qquad \text{Equation 4}$$

The system 10 maximizes the objective function $f_\theta(L; \mathcal{I})$ w.r.t. L when conducting test time optimization and therefore the optimization problem can be defined by Equation 5 as:

$$\max_L f_\theta(L; \mathcal{I}) \qquad \text{Equation 5}$$

In particular, Equation 5 denotes the MAP inference problem and the system 10 solves this problem via dual-decomposition as described in further detail below.

In step 92, the system 10 defines a graph G=(V, E) with M×N vertices representing a two-dimensional (2D) grid to define the MAP inference problem on the MRF. Each vertex can select one of the states in the label set $\mathcal{L} = \{1, 2, \ldots, L\}$. The system 10 defines a labeling of the 2D grid as $L \in \mathcal{L}^{|M \times N|}$ and a state of the vertex at a location i as $l_i$. For simplicity, the system 10 discards a dependency on $\theta$ and $\mathcal{I}$ for all potential functions $f$, $\phi$, and $\psi$ during the derivation of the inference algorithm since they are fixed for each inference. Accordingly, the MAP inference problem on the MRF is defined by Equation 6 as:

$$\max_L \sum_{i \in V} \psi(l_i) + \sum_{ij \in E} \phi(l_i, l_j) \qquad \text{Equation 6}$$

In step 94, the system 10 transforms the MAP inference problem defined by Equation 6 to an integer linear programming (ILP) problem. The system 10 denotes $x_i(l)$ as a distribution corresponding to vertex/location i and $x_{ij}(l', l)$ as a joint distribution corresponding to a pair of vertices/locations i, j. The system 10 defines a constraint set $X^G$ to enforce the pairwise and unary distribution to be consistent and discrete as follows:

$$\mathcal{X}^G = \left\{ x \; \middle| \; \begin{array}{l} \sum_l x_i(l) = 1, \forall\, i \in V \\ \sum_{l'} x_{ij}(l, l') = x_i(l), \forall\, (ij, l) \in E \times \mathcal{L} \\ x_i(l) \in \{0, 1\}, x_{ij}(l, l') \in \{0, 1\} \end{array} \right\}$$

As such, Equation 6 can be rewritten as an ILP as defined by Equation 7:

$$\max_x \sum_{i \in V} \psi_i \cdot x_i + \sum_{ij \in E} \phi_{ij} \cdot x_{ij} \qquad \text{Equation 7}$$

$$\text{s.t. } x \in \mathcal{X}^G$$

where $x_i$ and $\psi_i$ are $|\mathcal{L}|$ dimensional vectors denoting vertex distribution and scores at vertex i, while $x_{ij}$ and $\phi_{ij}$ are $|\mathcal{L}|^2$ dimensional vectors denoting edge distribution and scores for a pair of vertices (i,j).

In step 96, the system 10 decomposes the graph G with vertical and horizontal connections of arbitrary length into sets of horizontal and vertical chain sub-problems. Solving Equation 7 is generally NP-hard given an arbitrary graph with cycles. The system 10 tackles Equation 7 by first decomposing the graph G into a set of tree structured and solvable sub-problems such that each edge and vertex of the graph G=(V, E) is covered at least once by these sub-problems. Subsequently, the system 10 adds a set of additional constraints to enforce that maximizing configurations of each sub-problem agree with one another. These constraints are then relaxed by Lagrangian relaxation and the relaxed objective can be optimized by sub-gradient ascent or fixed point updates.

In particular, the system 10 defines a set of trees T that covers each vertex $i \in V$ and edge $ij \in E$ at least once. The set of variables corresponding to vertices and edges in tree $t \in T$ and all sets of such variables are denoted as $x^t$ and $\{x^t\}$. Additionally, T(i) and T(ij) respectively denote the set of trees that cover vertex $i \in V$ and edge $ij \in E$. In view of the foregoing, Equation 7 can be rewritten as Equation 8 below:

$$\max_{\{x^t\}, x} \sum_{t \in \mathcal{T}} \left( \sum_{i \in V} x_i^t \cdot \psi_i^t + \sum_{ij \in E} x_{ij}^t \cdot \phi_{ij}^t \right) \qquad \text{Equation 8}$$

$$\text{s.t. } x^t \in \mathcal{X}^G, \quad \forall\, t \in \mathcal{T}$$
$$x_i^t = x_i, \quad \forall\, i \in V, t \in \mathcal{T}(i)$$
$$x_{ij}^t = x_{ij}, \quad \forall\, ij \in E, t \in \mathcal{T}(ij)$$

As mentioned above, the system 10 decomposes the graph G with vertical and horizontal connections of arbitrary length into sets of horizontal and vertical chain sub-problems. For example, FIG. 5 is a diagram 110 illustrating decomposition processing carried out by the system 10 according to step 96 of FIG. 4. In particular, FIG. 5 illustrates the decomposition of a grid-graph G including long range interactions into sets of horizontal chains 122a, 124a and vertical chains 122b, 124b. The system 10 utilizes stride 1 and stride 2 edges for the system models. It should be understood that the derivation of the monotone fixed point algorithm for dual-decomposition described in further detail below with respect to step 98 of FIG. 4 holds for general graphs with arbitrary connections.

Referring back to step 96 of FIG. 4, by decomposing the graph G into sets of horizontal and vertical chain sub-problems, each node is covered multiple times while each edge is covered once and the system 10 replicates their scores by the number of times they are covered by the sub-problems. It should be understood that the replicated scores $\{\psi^t, \phi^t\}$ satisfy Equation 9 below as:

$$\sum_{t \in T(i)} \psi_i^t = \psi_i, \quad \phi_{ij}^t = \phi_{ij} \qquad \text{Equation 9}$$

Without a replicated edge, Equation 8 can be rewritten as Equation 10 below:

$$\max_{\{x^t\},x} \sum_{t \in \mathcal{T}} \left( \sum_{i \in V} x_i^t \cdot \psi_i^t + \sum_{ij \in E} x_{ij}^t \cdot \phi_{ij}^t \right) \qquad \text{Equation 10}$$

$$\text{s.t.} \quad x^t \in \mathcal{X}^G, \quad \forall t \in \mathcal{T}$$

$$x_i^t = x_i, \quad \forall i \in V, t \in \mathcal{T}(i)$$

Applying Lagrangian multipliers to relax the second set of constraints (e.g., agreement constraints among sub-problems) yields Equation 11 below as:

$$\min_{\{\lambda^t\}} \max_{\{x^t\},x} \sum_{t \in \mathcal{T}} \left( \sum_{i \in V} x_i^t \cdot (\psi_i^t + \lambda_i^t) + \sum_{ij \in E} x_{ij}^t \cdot \phi_{ij}^t - \sum_{i \in V} x_i \cdot \lambda_i^t \right) \qquad \text{Equation 11}$$

$$\text{s.t.} \quad x^t \in \mathcal{X}^G, \forall i \in \mathcal{T}$$

where $\lambda^t$ and $\{\lambda^t\}$ respectively denote dual variables for sub-problem t and the set of all sub-problems. $\lambda_i^t$ denotes dual variables for sub-problem t at location i and has a dimension of L (e.g., the number of labels/states). As such, the system 10 can determine whether if $\Sigma_{t \in \tau(i)} \lambda_i^t \neq 0$ for any $i \in V$, then $\lambda_i^t = +\infty$. Thus the system 10 enforces and it follows that $\Sigma_{i \in V} \Sigma_{t \in \tau} x_i \cdot \lambda_i^t = 0$. Therefore, $\{x\}$ can be eliminated from Equation 11 to yield Equation 12 as follows:

$$\min_{\{\lambda^t\}} \max_{\{x^t\}} \sum_{t \in \mathcal{T}} \left( \sum_{i \in V} x_i^t \cdot (\psi_i^t + \lambda_i^t) + \sum_{ij \in E} x_{ij}^t \cdot \phi_{ij}^t \right) \qquad \text{Equation 12}$$

$$\text{s.t.} \quad x^t \in \mathcal{X}^G, \quad \forall t \in \mathcal{T}$$

$$\sum_{t \in \mathcal{T}(i)} \lambda_i^t = 0, \quad \forall i \in V$$

In step 98, the system 10 derives a block coordinate-descent algorithm that monotonically decreases the objective of Equation 12. It is generally convenient to initialize $\lambda$'s as 0 and fold them into $\{\psi^t\}$ terms such that the system 10 optimizes an equivalent objective to Equation 12 over $\{\psi^t\}$ as defined by Equation 13:

$$\min_{\{\psi^t\}} \max_{\{x^t\}} \sum_{t \in \mathcal{T}} \left( \sum_{i \in V} x_i^t \cdot \psi_i^t + \sum_{ij \in E} x_{ij}^t \cdot \phi_{ij}^t \right) \qquad \text{Equation 13}$$

$$\text{s.t.} \quad x^t \in \mathcal{X}^G, \quad \forall t \in \mathcal{T}$$

$$\sum_{t \in \mathcal{T}(i)} \psi_i^t = \psi_i, \quad \forall i \in V$$

The system 10 fixes the dual variables for all sub-problems at all locations except for those at one location k and optimizes with respect to the vector $\psi_k^t$, $\forall t \in \tau(k)$ and primal variables $\{x^t\}$. The system 10 also defines $$\mu_k^t(l) = \psi_k^t(l) + \max_{\substack{x^t \in \mathcal{X}^G \\ x_k^t(l)=1}} \sum_{i \in V \setminus k} x_i^t \cdot \psi_i^t + \sum_{ij \in E} x_{ij}^t \cdot \phi_{ij}$$

as the max-marginal of sub-problem t at location k with $x_k^t(l)=1$. Similarly, the system 10 defines the max-marginal vector of sub-problem t at location k as $\mu_k^t$ and the max energy of sub-problem t as $\mu^t$. It should be understood that $\mu_k^t$ is a vector value while $\mu_k^t(l)$ and $\mu^t$ are scalar values. For a single location $k \in V$, a coordinate update to $\psi_k^t$, $\forall t \in \tau(k)$ is optimal and can be given by Equation 14 as follows:

$$\psi_k^t(l_k) \leftarrow \psi_k^t(l_k) - \left( \mu_k^t(l_k) - \frac{1}{|\mathcal{T}(k)|} \sum_{\bar{t} \in \mathcal{T}(k)} \mu_k^{\bar{t}}(l_k) \right), \qquad \text{Equation 14}$$

$$\forall t \in \mathcal{T}(k), l_k \in \mathcal{L}$$

The system 10 aims to optimize the linear program as defined by Equation 15 with respect to the dual variables where the primal variables $\{x^t\}$ are included in the max energy terms $\mu^t$ as follows:

$$\min_{\substack{\psi_k^t \in \mathbb{R}^{|\mathcal{L}|} \\ \mu^t \in \mathbb{R}^{|\mathcal{L}|} \\ \forall t \in \mathcal{T}(k)}} \sum_{t \in \mathcal{T}(k)} \mu^t \qquad \text{Equation 15}$$

$$\text{s.t.} \quad \hat{\mu}_k^t(l_k) + \psi_k^t(l_k) - \hat{\psi}_k^t(l_k) \le \mu^t, \forall t \in \mathcal{T}(k), \forall l_k \in \mathcal{L}$$

$$\sum_{t \in \mathcal{T}(k)} \psi_k^t(l_k) = \psi_k(l_k), \forall l_k \in \mathcal{L}$$

where $\hat{\mu}_k^t(l_k)$ and $\hat{\psi}_k^t(l_k)$ in the first set of constraints are max-marginals and unary potentials at location k after applying the update rule of Equation 14. This set of constraints is derived from the fact that $\hat{\mu}_k^t(l_k) + \psi_k^t(l_k) - \hat{\psi}_k^t(l_k) = \mu_k^t(l_k)$, $\forall l_k \in \mathcal{L}$ and $\mu^t = \max_{l_k \in \mathcal{L}} \mu_k^t(l_k)$. Converting Equation 15 to dual form yields Equation 16 below:

$$\max_{\substack{\alpha^t \ge 0, \forall t \in \mathcal{T}(k) \\ \beta(l_k) \in \mathbb{R}^{|\mathcal{L}|}}} \sum_{l_k \in \mathcal{L}} \beta(l_k) \cdot \psi_k(l_k) + \sum_{t \in \mathcal{T}(k)} \sum_{l_k \in \mathcal{L}} \alpha^t(l_k) \left( \hat{\mu}_k^t(l_k) - \hat{\psi}_k^t(l_k) \right) \qquad \text{Equation 16}$$

$$\text{s.t.} \quad 1 - \sum_{l_k \in \mathcal{L}} \alpha^t(l_k) = 0, \quad \forall t \in \mathcal{T}(k)$$

$$\beta(l_k) - \alpha^t(l_k) = 0, \quad \forall t \in \mathcal{T}(k)$$

It can be inferred from the second set of constraints that the terms $\alpha^t(l_k)=\alpha^{\bar{i}}(l_k)$, $\forall (l,\bar{t})\in\tau(k)\times\tau(k)$, setting $\beta(l_k)=\alpha^{\bar{i}}(l_k)$ for any $\bar{i}\in\tau(k)$ for all $l_k\in\mathcal{L}$, yields the optimization as Equation 17 below:

$$\max_{\alpha^{\bar{i}} \geq 0} \sum_{l_k \in \mathcal{L}} \alpha^{\bar{i}}(l_k) \cdot \left( \psi_k(l_k) - \sum_{i \in \mathcal{T}(k)} \hat{\psi}_k^t(l_k) \right) + \quad \text{Equation 17}$$

$$\sum_{l_k \in \mathcal{L}} \sum_{i \in \mathcal{T}(k)} \alpha^{\bar{i}}(l_k) \cdot \hat{\mu}_k^t(l_k)$$

$$\text{s.t. } 1 - \sum_{l_k \in \mathcal{L}} \alpha^{\bar{i}}(l_k) = 0$$

It should be understood that the update rule denoted by Equation 14 satisfies $\Sigma_{t\in\tau(k)}\hat{\psi}_k^t=\psi_k$. As such, Equation 17 can be simplified as Equation 18 below:

$$\max_{\alpha^{\bar{i}} \geq 0} \sum_{l_k \in \mathcal{L}} \sum_{i \in \mathcal{T}(k)} \alpha^{\bar{i}}(l_k) \cdot \hat{\mu}_k^t(l_k) \quad \text{Equation 18}$$

$$\text{s.t. } 1 - \sum_{l_k \in \mathcal{L}} \alpha^{\bar{i}}(l_k) = 0$$

It should be understood that applying Equation 14 yields $\hat{\mu}_k^t=\hat{\mu}_k^{\bar{i}}$, $\forall(t,\bar{t})\in\tau(k)\times\tau(k)$. Therefore, Equation 18 is equivalent to $\max_{l_k \in \mathcal{L}} \Sigma_{t\in\tau(k)}\hat{\mu}_k^t(l_k) = \Sigma_{t\in\tau(k)}\hat{\mu}^t$. Additionally, applying Equation 14 to a single location yields $\Sigma_{t\in\tau(k)}\hat{\mu}^t = \Sigma_{t\in\tau(k)}\mu^t$. Thus Equation 15 is equivalent to Equation 18 such that the duality gape of the LP is 0 and the update of Equation 14 is an optimal coordinate update step.

In practice, the system 10 could update all $\psi$'s at once, which, although it may yield slower convergence, may provide for efficient parallel algorithms for modern Graphics Processing Unit (GPU) architectures. Intuitively, a neural network can minimize an empirical risk with respect to the coordinate-descent algorithm of the system 10 since an output from any coordinate-descent step is sub differentiable.

A known theorem states that applying an update to $\psi_i^t$, $\forall_i\in V$, $t\in\tau(i)$ does not increase the objective of Equation 13 where the update is defined by Equation 19 below as:

$$\psi_i^t(l_i) \leftarrow \psi_i^t(l_i) - \frac{1}{|V^0|}\left( \mu_i^t(l_i) - \frac{1}{|\mathcal{T}(i)|} \sum_{\bar{t}\in\mathcal{T}(i)} \mu_i^{\bar{t}}(l_i) \right), \quad \text{Equation 19}$$

$$\forall\, i \in V, t \in \mathcal{T}(i), l_i \in \mathcal{L}$$

where $|V^0|=\max_{t\in T}|V^t|$ and $|V^t|$ denotes a number of vertices in sub-problem t. To prove the theorem, $\hat{\mu}^t$ denotes the max energy of sub-problem t after applying the update defined by Equation 19 to $\{\psi^t\}$ and $\bar{\mu}_i^t$ denotes the max energy of sub-problem t after applying the update defined by Equation 14 for location i. The changes in objective from updating $\{\psi^t\}$ according to Equation 19 are defined by Equation 20 as:

$$-\sum_{t\in\mathcal{T}}\mu^t + \sum_{t\in\mathcal{T}}\hat{\mu}^t \quad \text{Equation 20}$$

$\mu^t$ can be briefly expanded by Equation 21 as:

$$\mu^t = \max_{x^t} \sum_{i\in V} x_i^t \cdot \psi_i^t + \sum_{ij\in E} x_{ij}^t \cdot \phi_{ij} \quad \text{Equation 21}$$

$$\text{s.t. } x^t \in \mathcal{X}^\mathcal{G}$$

In view of the above, $\mu^t$ can be considered to be a convex function of $\psi^t$ because $\mu^t$ is the maximum of a set of affine functions (each of which is defined by a point in $X^{\mathcal{G}}$) of $\psi^t$. When $|V^0|=\max_{t\in T}|V^t|$, Jensen's Inequality can be applied to the second term of Equation 20 as follows:

$$\text{Eq. (20)} \leq -\sum_{t\in\mathcal{T}}\mu^t + \sum_{i\in\mathcal{T}}\left( \frac{|V^0|-|V^t|}{|V^0|}\mu^t + \sum_{i\in V^t}\frac{1}{|V^0|}\bar{\mu}_i^t \right) =$$

$$\frac{1}{|V^0|}\sum_{t\in\mathcal{T}}\sum_{i\in V^t}(\bar{\mu}_i^t - \mu^t) = \frac{1}{|V^0|}\sum_{i\in V^0}\sum_{t\in\mathcal{T}(i)}(\bar{\mu}_i^t - \mu^t)$$

Here it is observed that $\Sigma_{t\in\tau(i)}\bar{\mu}_i^t$ corresponds to Equation 18 while $\Sigma_{t\in\tau(i)}\mu^t$ corresponds to Equation 15. Since Equation 15 and Equation 18 are primal and dual of an LP, then Equation 18 is less than or equal to Equation 15. Therefore $\Sigma_{t\in\tau(i)}(\bar{\mu}_i^t-\mu^t)\leq 0$ which results in Equation 20≤0. As such, the update of Equation 19 constitutes a non-increasing step to the objective of Equation 13.

It should be understood that the update rules of the system 10 differ from conventional tree-block coordinate descent and its variant. For example, Equation 19 avoids reparameterization of edge potentials which can be expensive when forming coordinate-descent as differential layers, as memory consumption grows linearly with the number of coordinate-descent steps while each step requires $\mathcal{O}(|E|\times|\mathcal{L}|^2)$ memory for storing edge potentials. The update rules of the system 10 are similar to a fixed-point update of a known approach but the monotone fixed-point update of this known approach is effective on a single covering tree and therefore is not amenable for parallel computation. Furthermore, for a simultaneous update to all locations, the system 10 proves a monotone update step-size of $$\frac{1}{\max_{t\in T}|V^t|}$$

while the known approach merely proves a monotone update step-size $$\frac{1}{|V|}$$

which is smaller. The coordinate-descent fixed-point update algorithm is described in further detail below as Algorithm 1 with respect to FIG. 6.

FIG. 6 is a diagram 130 illustrating the fixed-point algorithm for dual-decomposition (Algorithm 1) implemented by the system 10. Algorithm 1 provides several advantages. For example, Algorithm 1 is parallelizable with modern deep learning frameworks as the sub-problems $t\in\tau$ can be solved in parallel and operations can be defined in forms of a sum and a max of matrices. Additionally, unlike subgradient-based methods, the fixed-point update is fully sub-differentiable. It should be understood that the fixed-point update is not differentiable everywhere because of the utilization of max operators when computing max-marginals as described in further detail below with respect to FIG. 8. Accordingly, Algorithm 1 is sub-differentiable except for the decoding of a final primal solution as described in further detail below with respect to FIG. 7.

Figure 7:
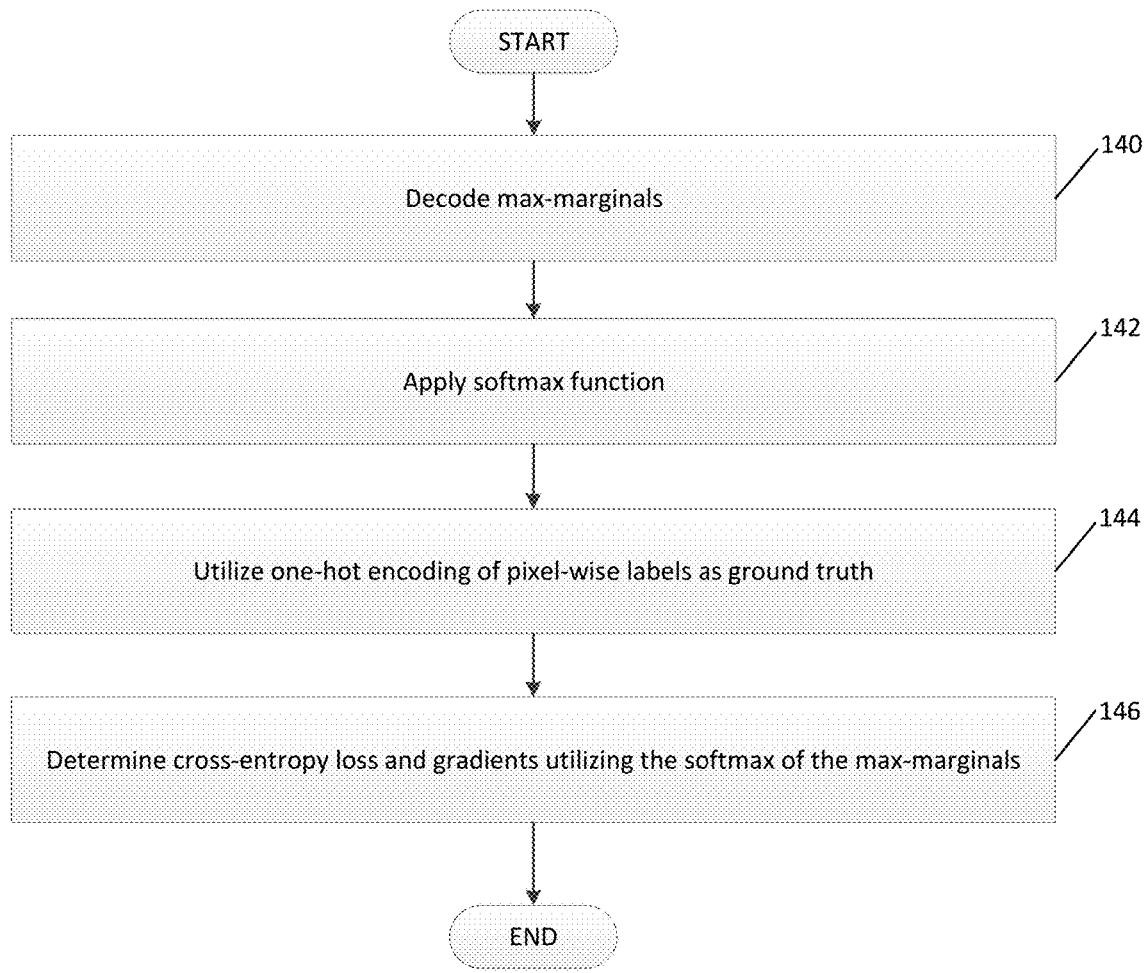
FIG. 7 is a flowchart illustrating step 72 of FIG. 3 in greater detail.

FIG. 7 is a flowchart illustrating step 72 of FIG. 3 in greater detail. It should be understood that Algorithm 1 does not always converge. Therefore, in step 140 the system 10 decodes primal results given intermediate max-marginals $\{\mu^t\}$ and $\{x^{t*}\}$ that do not necessarily agree on each other. In particular, the system 10 can decode $x_i^*$ given $\mu_i^t(l)$, $\forall l \in \{1, \ldots L\}$, $\forall t \in \tau(i)$ as defined by Equation 22 below:

$$x_i^* = \underset{l \in \{1,\ldots,L\}}{\operatorname{argmax}} \sum_{t \in \mathcal{T}(i)} \mu_i^t(l) \quad \text{Equation 22}$$

Equation 22 is neither differentiable nor sub-differentiable and is the only non-differentiable portion of Algorithm 1. Accordingly, in step 142, the system 10 applies a softmax function on $\Sigma_{t \in \tau(i)}\mu_i^t$ where $\mu_i^t$ is a vector of length L to output a probability distribution over L labels defined by Equation 23 below:

$$p(x_i) = \frac{\exp\left(\sum_{t \in \mathcal{T}(i)} \mu_i^t\right)}{\sum_{l' \in \{1,\ldots,L\}} \exp\left(\sum_{t \in \mathcal{T}(i)} \mu_i^t(l')\right)} \quad \text{Equation 23}$$

In step 144, the system 10 utilizes one-hot encoding of pixel-wise labels as the ground truth. Then, in step 146, the system 10 determines cross-entropy loss and gradients utilizing the softmax of the max-marginals which is sub-differentiable. Thus, the system 10 is end-to-end trainable with respect to CNN parameters θ.

Referring back to FIG. 6, it should be understood that line 6 of Algorithm 1 is indicative of dynamic programming over trees. The system 10 can expand max-marginals of any $i \in V$, $t \in \tau$ recursively as defined by Equation 24:

$$\mu_i^t(l) = \psi_i^t(l) + \sum_{j \in C(i)} \max_{l'}(\phi_{ij}(l, l') + \mu_j^t(l')) \quad \text{Equation 24}$$

where C(i) denotes a set of neighbors of node i. The max operator is only sub-differentiable. Common activation functions in neural networks such as Rectified Linear Unit (ReLU) and leaky ReLU are also based on a max operation and are thus sub-differentiable. In practice, the parameters for generating the $\{\psi, \phi\}$ terms are often initialized from zero-mean uniform Gaussian distributions. As such, at a start of training the $\{\psi, \phi\}$ terms are near-identical over classes and locations while max(•) over such terms can be random. It should be understood that in a backward pass, the gradient $\partial L/\partial \mu_i^t(l)$ will only flow through the maximum of the max operator which can hinder learning progression and can yield inferior training and testing results. Accordingly, the system 10 implements a smoothed-max operator with negative-entropy regularization, whose forward pass is a log-sum-exp operator while the backward pass is a soft-max operator.

Figure 8:
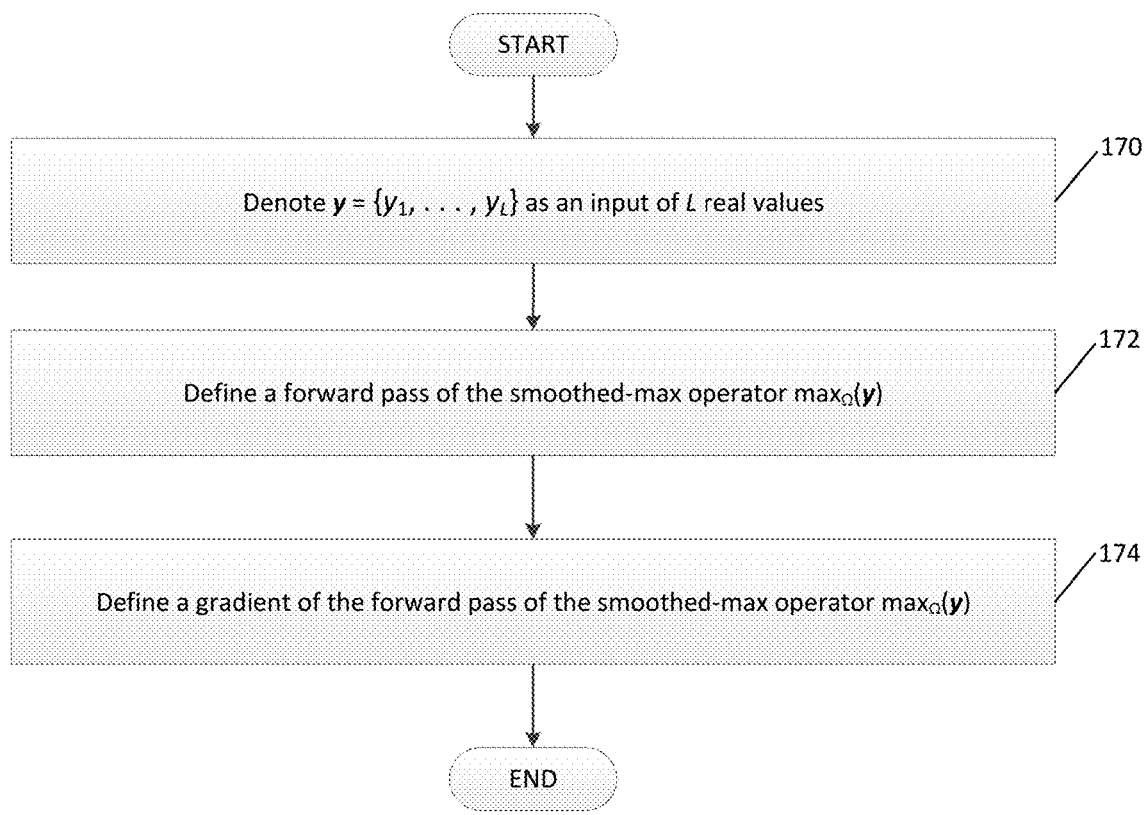
FIG. 8 is a flowchart illustrating step 74 of FIG. 3 in greater detail.

FIG. 8 is a flowchart illustrating step 74 of FIG. 3 in greater detail. In particular, FIG. 8 illustrates processing steps for implementing a smoothed-max operator with negative-entropy regularization. Beginning in step 170, the system 10 denotes $y = \{y_1, \ldots, y_L\}$ as an input of L real values. Then, in steps 172 and 174, the system 10 respectively defines a forward pass of the smoothed-max operator $\max_\Omega$ (y) by Equation 25 as:

$$\max_\Omega (y) = \gamma \log\left(\sum_l \exp(y_l/\gamma)\right) \quad \text{Equation 25}$$

and defines a gradient of the forward pass of the smoothed-max operator $\max_\Omega(y)$ by Equation 26 as:

$$\nabla \max_\Omega (y) = \frac{\exp(y/\gamma)}{\sum_l \exp(y_l/\gamma)} \quad \text{Equation 26}$$

where γ denotes a positive value that controls a strength of the convex regularization. It should be understood that the gradient vector defined by Equation 26 is indicative of a softmax over input values. This ensures that gradients from the loss layer can flow equally through input logits when inputs are near-identical thereby facilitating an initialization of the training process. It should also be understood that the negative-entropy regularized smoothed-max operator of Equation 25 satisfies associativity and distributivity, and that for tree-structured graphs, the smoothed-max-energy determined via a recursive dynamic program is equivalent to the smoothed-max over the combinatorial space $X^G$. As described in detail below, Algorithm 1 can optimize a convex upper bound of Equation 13 when replacing a standard max with the smoothed-max defined by Equation 25 while both Equations 14 and 19 still hold. The system 10 provides for faster convergence of Algorithm 1 when the smoothed-max is utilized with a reasonable γ (e.g., γ=1.0 or 2.0).

For simplicity and to prove that Equations 14 and 19 still hold for a monotone fixed-point algorithm for dual-composition with smoothed-max, the dual-decomposition objective (e.g., Equation 13) is restated as Equation 27 below:

$$\min_{\{\psi^t\}} \max_{\{x^t\}} \sum_{t \in \mathcal{T}} \left( \sum_{i \in V} x_i^t \cdot \psi_i^t + \sum_{ij \in E} x_{ij}^t \cdot \phi_{ij} \right) \quad \text{Equation 27}$$

$$\text{s.t.} \quad x^t \in X^G, \quad \forall t \in \mathcal{T}$$

$$\sum_{t \in \mathcal{T}(i)} \psi_i^t = \psi_i, \quad \forall i \in V$$

Since $x^t$'s are independent of each other $\forall t \in \tau$, the max can be moved to a right of $\tau_{t \in \tau}$ to yield Equation 28:

$$\min_{\{\psi^t\}} \sum_{t \in \mathcal{T}} \max_{x^t} \left( \sum_{i \in V} x_i^t \cdot \psi_i^t + \sum_{ij \in E} x_{ij}^t \cdot \phi_{ij} \right) \quad \text{Equation 28}$$

$$\text{s.t.} \quad x^t \in X^G, \quad \forall t \in \mathcal{T}$$

$$\sum_{t \in \mathcal{T}(i)} \psi_i^t = \psi_i, \quad \forall i \in V$$

The max can be replaced with the smoothed-max as defined by Equation 25 to yield a new objective as defined by Equation 29:

$$\min_{\{\psi^t\}} \sum_{t \in \mathcal{T}} \gamma \log \qquad \text{Equation 29}$$

$$\sum_{x^t \in \mathcal{X}^{\mathcal{G}}} \exp\left(\frac{\sum_{i \in V} x_i^t \cdot \psi_i^t + \sum_{ij \in E} x_{ij}^t \cdot \phi_{ij}}{\gamma}\right)$$

$$\text{s.t.} \sum_{t \in \mathcal{T}(i)} \psi_i^t = \psi_i, \ \forall \ i \in V$$

It should be understood that the objective with smoothed-max as defined by Equation 29 corresponds to a tree-reweighted belief propagation (TRBP) objective that bounds a partition function (e.g., Z in Equation 1) with a decomposition of a graph into trees and the system 10 implements a monotone, highly parallel coordinate descent approach to minimize bounds of the partition function. It is noted that dual-decomposition does not represent overhead when each edge is only covered once but if a more complex tree bound is required, then TRBP can be utilized to minimize over edge appearance probabilities. The smoothed-max marginal of state $l_i$ at location i on sub-problem t is defined by Equation 30 below:

$$v_i^t(l_i) = \psi_i^t(l_i) + \sum_{j \in C(i)} \gamma \log\left(\sum_{l_j \in \mathcal{L}} \exp\left(\frac{v_j^t(l_j) + \phi_{ij}^t(l_i, l_j)}{\gamma}\right)\right) \qquad \text{Equation 30}$$

where C(i) denotes a set of neighbors of node i.

Similar to max-marginal vector $\mu_i^t$ for sub-problem t location i and max-energy $\mu^t$ for sub-problem t, the smoothed max-marginal vector $v_i^t$ for sub-problem t location i is defined and the smoothed-max energy $v^t$ for sub-problem t is also defined. In particular, Equation 31 defines the smoothed-max energy as:

$$v^t = \gamma \log\left(\sum_{l_i \in \mathcal{L}} \exp\left(\frac{v_i^t(l_i)}{\gamma}\right)\right), \ \forall \ i \in V^t \qquad \text{Equation 31}$$

Equation 31 is equivalent for any $i \in V^t$ because a smoothed-max with negative-entropy regularization (e.g., log-sum-exp) over a combinatorial space of a tree-structured problem is equal to a smoothed-max-energy determined via dynamic programs with a smoothed-max operator. This is given by Equation 32 below as:

$$v^t = \gamma \log \sum_{x^t \in \mathcal{X}^{\mathcal{G}}} \exp\left(\frac{\sum_{i \in V} x_i^t \cdot \psi_i^t + \sum_{ij \in E} x_{ij}^t \cdot \phi_{ij}}{\gamma}\right) \qquad \text{Equation 32}$$

The system 10 provides and proves a new monotone update rule for Equation 29 when fixing the dual variables for all sub-problems at all locations except for those at one location k and optimizing with respect to the vector $\psi_k^t$, $\forall t \in \tau(k)$. In particular, for a single location $k \in V$, the following coordinate update to $\psi_k^t$, $\forall t \in \tau(k)$ defined by Equation 33 below is optimal:

$$\psi_k^t(l_k) \leftarrow \psi_k^t(l_k) - \left(v_k^t(l_k) - \frac{1}{|\mathcal{T}(k)|} \sum_{\bar{t} \in \mathcal{T}(k)} v_k^{\bar{t}}(l_k)\right), \qquad \text{Equation 33}$$

$$\forall \ t \in \mathcal{T}(k), l_k \in \mathcal{L}$$

The system 10 endeavors to optimize the linear program with respect to $\psi_k^t$ as defined by Equation 34 below and where $v_k^t(l_k)$ is a function of $\psi_k^t(l_k)$:

$$\min_{\substack{\psi_k^t \in \mathbb{R}^{|\mathcal{L}|}, \\ \forall t \in \mathcal{T}(k)}} \sum_{t \in \mathcal{T}(k)} \gamma \log\left(\sum_{l_k \in \mathcal{L}} \exp\left(\frac{v_k^t(l_k)}{\gamma}\right)\right) \qquad \text{Equation 34}$$

$$\text{s.t.} \sum_{t \in \mathcal{T}(k)} \psi_k^t(l_k) = \psi_k(l_k), \ \forall \ l_k \in \mathcal{L}$$

Since it is a monotonically increasing function (for positive $\gamma$), $\gamma \log(\bullet)$ can be removed from Equation 34 to yield Equation 35 below as:

$$\min_{\substack{\psi_k^t \in \mathbb{R}^{|\mathcal{L}|}, \\ \forall t \in \mathcal{T}(k)}} \prod_{t \in \mathcal{T}(k)} \left(\sum_{l_k \in \mathcal{L}} \exp\left(\frac{v_k^t(l_k)}{\gamma}\right)\right) \qquad \text{Equation 35}$$

$$\text{s.t.} \sum_{t \in \mathcal{T}(k)} \psi_k^t(l_k) = \psi_k(l_k), \ \forall \ l_k \in \mathcal{L}$$

Defining $\lambda_k^t$ as the change of $\psi_k^t$ after some update and optimizing over $\lambda_k^t$ while fixing $\psi_k^t$ yields Equation 36 below:

$$\min_{\substack{\lambda_k^t \in \mathbb{R}^{|\mathcal{L}|}, \\ \forall t \in \mathcal{T}(k)}} \prod_{t \in \mathcal{T}(k)} \left(\sum_{l_k \in \mathcal{L}} \exp\left(\frac{v_k^t(l_k) + \lambda_k^t(l_k)}{\gamma}\right)\right) \qquad \text{Equation 36}$$

$$\text{s.t.} \sum_{t \in \mathcal{T}(k)} \lambda_k^t(l_k) = 0, \ \forall \ l_k \in \mathcal{L}$$

As such and in terms of $\lambda_k^t(l_k)$, the update rule defined by Equation 33 is equivalent to the solution given by Equation 37 below:

$$\lambda_k^t(l_k) = -v_k^t(l_k) + \frac{1}{|\mathcal{T}(k)|} \sum_{\bar{t} \in \mathcal{T}(k)} v_k^{\bar{t}}(l_k), \ \forall \ t \in \mathcal{T}(k) \qquad \text{Equation 37}$$

This solution makes $v_k^t(l_k) + \lambda_k^t(l_k) = v_k^{\bar{t}}(l_k) + \lambda_k^{\bar{t}}(l_k)$, $\forall l_k \in \mathcal{L}$, $\forall (t, \bar{t}) \in \tau(k) \times \tau(k)$. Thus, if applying the solution given by Equation 37, the equality condition of the arithmetic mean and geometric mean (AM-GM) inequality is met resulting in:

$$\prod_{t \in \mathcal{T}(k)} \left(\sum_{l_k \in \mathcal{L}} \exp\left(\frac{v_k^t(l_k) + \lambda_k^t(l_k)}{\gamma}\right)\right) =$$

-continued $$\left(\frac{1}{|\mathcal{T}(k)|}\sum_{t\in\mathcal{T}(k)}\sum_{l_k\in\mathcal{L}}\exp\left(\frac{v_k^t(l_k)+\lambda_k^t(l_k)}{\gamma}\right)\right)^{|\mathcal{T}(k)|}$$

When performing minimization, the denominator and exponent on the right-hand side can be eliminated. Accordingly, the objective is defined by Equation 38 below:

$$\min_{\substack{\lambda_k^t\in\mathbb{R}^{|\mathcal{L}|},\\ \forall t\in\mathcal{T}(k)}}\sum_{t\in\mathcal{T}(k)}\left(\sum_{l_k\in\mathcal{L}}\exp\left(\frac{v_k^t(l_k)+\lambda_k^t(l_k)}{\gamma}\right)\right) \quad \text{Equation 38}$$

$$\text{s.t.}\sum_{t\in\mathcal{T}(k)}\lambda_k^t(l_k)=0,\,\forall\,l_k\in\mathcal{L}$$

It is equivalent to optimize for each unique $l_k \in \mathcal{L}$ independently since there is no constraint over different pairs in label space (e.g., $\mathcal{L}\times\mathcal{L}$). Thus, each optimization problem can be defined by Equation 39 below:

$$\min_{\substack{\lambda_k^t(l_k)\in\mathbb{R},\\ \forall t\in\mathcal{T}(k)}}\sum_{t\in\mathcal{T}(k)}\exp\left(\frac{v_k^t(l_k)+\lambda_k^t(l_k)}{\gamma}\right) \quad \text{Equation 39}$$

$$\text{s.t.}\sum_{t\in\mathcal{T}(k)}\lambda_k^t(l_k)=0$$

Converting Equation 39 to dual form yields Equation 40 below:

$$\min_{\substack{\lambda_k^t(l_k)\in\mathbb{R},\\ \forall t\in\mathcal{T}(k)}}\max_{\alpha\in\mathbb{R}}\sum_{t\in\mathcal{T}(k)}\exp\left(\frac{v_k^t(l_k)+\lambda_k^t(l_k)}{\gamma}\right)-\alpha\sum_{t\in\mathcal{T}(k)}\lambda_k^t(l_k) \quad \text{Equation 40}$$

It should be understood that the min can be positioned on an outside of Equation 40 because a Linear Programming (LP) problem always satisfies a Karush-Kuhn-Tucker (KKT) condition. Setting a derivative of Equation 40 w.r.t. $\lambda_k^t(l_k)$ to zero for any sub-problem t, yields Equation 41 below:

$$\alpha=\frac{1}{\gamma}\exp\left(\frac{v_k^t(l_k)+\lambda_k^t(l_k)}{\gamma}\right),\,\forall\,t\in\mathcal{T}(k) \quad \text{Equation 41}$$

In view of the foregoing, Equation 37 satisfies $v_k^t(l_k)+\lambda_k^t(l_k)=v_k^{\bar{t}}(l_k)+\lambda_k^{\bar{t}}(l_k)$, $\forall(t,\bar{t})\in\tau(k)\times\tau(k)$. It should be understood that $\Sigma_{t\in\tau(k)}\lambda_k^t(l_k)=0$ is satisfied when applying Equation 39 and therefore it follows that Equation 39 is equivalent to Equation 40 (e.g., the duality gap of the LP is 0 and the update rule defined by Equation 33 is an optimal update for Equation 29).

Additionally, the following proves the monotone update step for simultaneously updating all locations for dual-decomposition with smoothed-max. In particular, the update to $\psi_i^t$, $\forall i \in V$, $t \in \tau(i)$ as defined by Equation 42 below does not increase the objective as defined by Equation 29:

$$\psi_i^t(l_i)\leftarrow\psi_i^t(l_i)-\frac{1}{|V^0|}\left(v_i^t(l_i)-\frac{1}{|\mathcal{T}(i)|}\sum_{\bar{t}\in\mathcal{T}(i)}v_i^{\bar{t}}(l_i)\right), \quad \text{Equation 42}$$

$$\forall\,i\in V,\,t\in\mathcal{T}(i),\,l_i\in\mathcal{L}$$

where $|V^0|=\max_{t\in\tau}|V^t|$ and $|V^t|$ denotes a number of vertices of sub-problem t.

It should be understood that $\hat{v}^t$ is denoted as the smoothed-max-energy of sub-problem t after applying the update defined by Equation 42 to $\{\psi^t\}$ and that $\bar{v}_i^t$ is denoted as the smoothed-max-energy of sub-problem t after applying the update defined by Equation 33 for location i. Considering changes in the objective from updating $\{\psi^t\}$ according to Equation 42 yields Equation 43 below:

$$-\sum_{t\in\mathcal{T}}v^t+\sum_{t\in\mathcal{T}}\hat{v}^t \quad \text{Equation 43}$$

It can be deducted that $v^t$ as defined by Equation 23 (and consequently $\hat{v}^t$) is a convex function of $\psi^t$ in view of the following: (1) $\Sigma_{i\in V}x_i^t\cdot\psi_i^t+\Sigma_{ij\in E}x_{ij}^t\cdot\phi_{ij}$ is a non-decreasing convex function of $\psi^t$ for any $x^t\in X^G$, and (2) the log-sum-exp function is a non-decreasing convex function, and a composition of two non-decreasing convex functions is convex such that $v^t$ (and $\hat{v}^t$) is a convex function of $\psi^t$. Applying Jensen's Inequality to the second term of Equation 43 yields:

$$\text{Eq. }(43)\leq-\sum_{t\in\mathcal{T}}v^t+\sum_{t\in\mathcal{T}}\left(\frac{|V^0|-|V^t|}{|V^0|}v^t+\sum_{i\in V^t}\frac{1}{|V^0|}\bar{v}_i^t\right)=$$

$$\frac{1}{|V^0|}\sum_{t\in\mathcal{T}}\sum_{i\in V^t}(\bar{v}_i^t-v^t)=\frac{1}{|V^0|}\sum_{i\in V^t}\sum_{t\in\mathcal{T}(i)}(\bar{v}_i^t-v^t)$$

Accordingly, it can be observed that $\Sigma_{t\in\tau(x)}v_i^t$ corresponds to the objective defined by Equation 34 before applying the update defined by Equation 33 and that $\Sigma_{t\in\tau(x)}\bar{v}^t$ corresponds to the same objective after applying the update defined by Equation 33. Based on the foregoing, the update defined by Equation 33 does not increase the objective defined by Equation 34. Therefore, it follows that $\tau_{t\in\tau(x)}(\bar{v}_i^t-v^t)\leq0$, which results in Equation 43 being equal to or less than 0 and thus the update defined by Equation 42 constitues a non-increasing step to the objective defined by Equation 29.

As mentioned above, it should be understood that line 6 of Algorithm 1 (as shown in FIG. 6) is indicative of dynamic programming over trees. Dynamic programming can be implemented utilizing basic operators of PyTorch together with its AutoGrad feature but can be inefficient. As such, the system 10 can create a dynamic programming layer to determine horizontal and vertical marginals on a pixel grid for line 6 of Algorithm 1 which can be ten times faster than a naïve PyTorch implementation. As described in detail below with respect to FIGS. 9-11, the system 10 can implement forward and backward passes for determining max-marginals and corresponding gradients on an M×M pixel grid as a parallel algorithm with a time complexity of $\mathcal{O}(M|\mathcal{L}|)$ for each of a smoothed-max operator and a max-operator.

Figure 9:
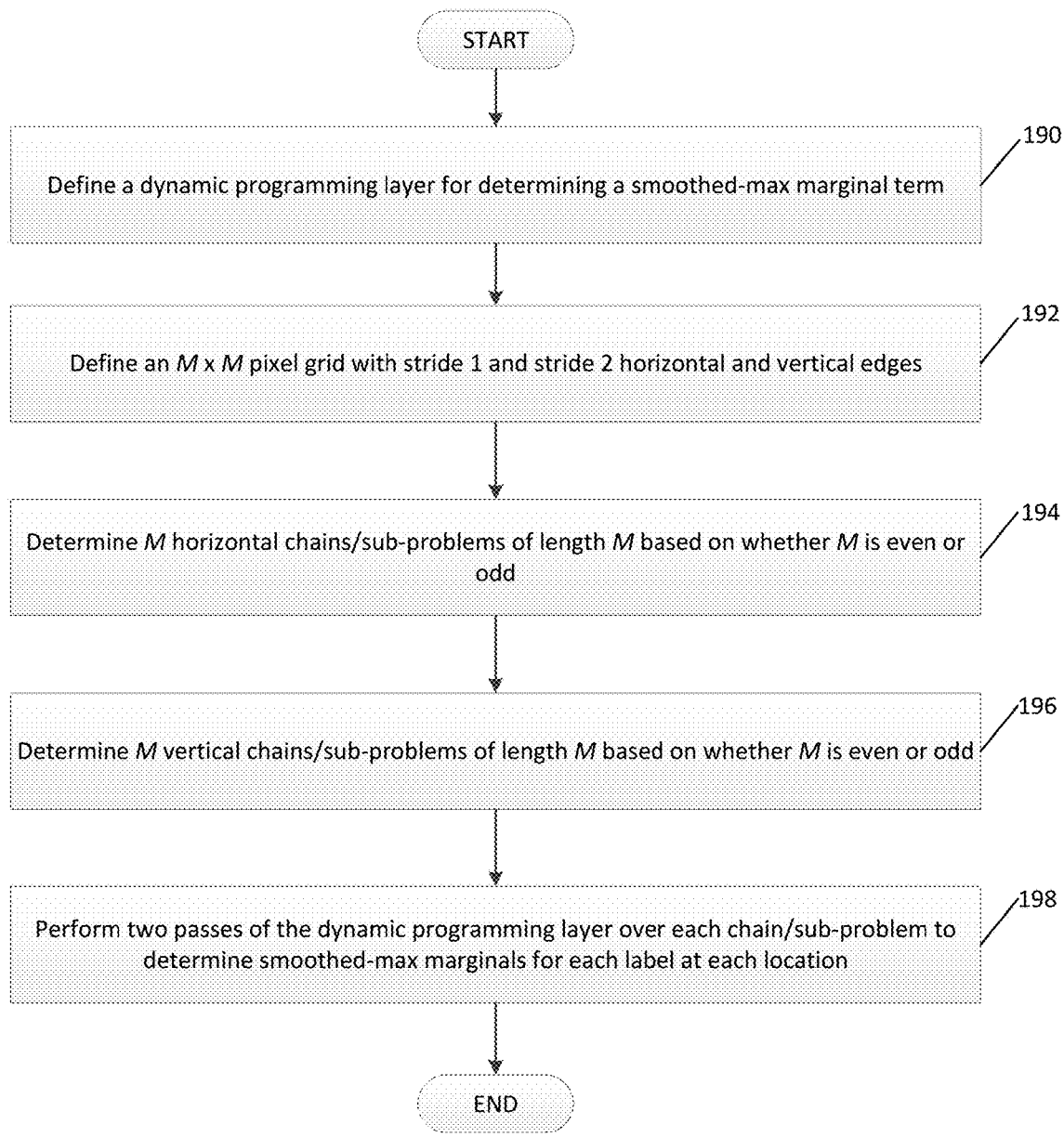
FIG. 9 is a flowchart illustrating step 76 of FIG. 3 in greater detail.

FIG. 9 is a flowchart illustrating step 76 of FIG. 3 in greater detail. In particular, FIG. 9 illustrates processing steps for deriving an algorithm to determine smoothed-max-marginals and their corresponding gradients. It should be understood that a variation of these processing steps can be utilized to derive an algorithm to determine max-marginals and their corresponding gradients. Beginning in step 190, the system 10 defines a dynamic programming layer for determining a smoothed-max-marginal term $v_i^t(l_i)$ as defined by Equation 44:

$$v_i^t(l_i) = \psi_i^t(l_i) + \sum_{j \in C(i)} \gamma \log \left( \sum_{l_j \in \mathcal{L}} \exp\left( \frac{v_j^t(l_j) + \phi_{ij}^t(l_i, l_j)}{\gamma} \right) \right) \quad \text{Equation 44}$$

It should be understood that the system 10 can alternatively define a dynamic programming layer for determining a max-marginal term $\mu_i^t(l_i)$ as defined by Equation 45:

$$\mu_i^t(l_i) = \psi_i^t(l_i) + \sum_{j \in C(i)} \max_{l_j \in \mathcal{L}}(\phi_{ij}(l_i, l_j) + \mu_j^t(l_j)) \quad \text{Equation 45}$$

It should also be understood that for any leaf nodes k, that $C(k)=\emptyset$. In step 192 and without loss of generality, the system 10 defines an M×M pixel grid with stride 1 and stride 2 horizontal and vertical edges (as shown in FIG. 5). In steps 194 and 196, the system 10 respectively determines M horizontal chains (e.g., sub-problems) of length M and M vertical chains (e.g., sub-problems) of length M based on whether M is even or odd. In particular, if M is even, then the system 10 determines 2M horizontal chains and 2M vertical chains of length M/2. Alternatively, if M is odd, then the system 10 determines M horizontal chains and M vertical chains of length and ⌈M/2⌉ horizontal chains and M vertical chains of length ⌊M/2⌋. It is known that determining smoothed-max-marginals for each chain (e.g., sub-problem) can be performed in parallel. A less known point for parallelism is that for each sub-problem t at a location i, $v_i^t(l_i)$ can be determined for each $l_i \in \mathcal{L}$ in parallel. This requires the threads within sub-problem t to be synchronized at each location before proceeding to a next location. As such, in step 198, the system 10 performs two passes of the dynamic programming layer over each sub-problem to determine the smoothed-max-marginals for each label at each location. Therefore, the total time complexity is $\mathcal{O}(M|\mathcal{L}|)$ and the space complexity is $\mathcal{O}(M|\mathcal{L}|^2)$ ($|\mathcal{L}|^2$ is for storing soft-max probabilities for later use in a backward pass and the space complexity becomes $\mathcal{O}(M|\mathcal{L}|)$ if the system 10 does not determine the gradients).

It should be understood that with respect to a backward pass, a loss function is determined with smoothed-max-marginals of all locations and labels thereby necessitating differentiation through all locations and labels. This yields an algorithm having a time complexity of $\mathcal{O}(M^2|\mathcal{L}|)$ with parallelization over locations and labels at each location) such that a gradient at one location can be affected by a gradient from all locations. Alternatively, a backward pass can be performed by commencing from a root/leaf location, passing gradients to a next location while also adding in the gradients of the next location from the loss layer, and recursing till the leaf/root. The system 10 can perform two passes of this dynamic programming layer to determine final gradients for each location which yields an algorithm having a total time complexity $\mathcal{O}(M|\mathcal{L}|)$ and a space complexity $\mathcal{O}(M|\mathcal{L}|^2)$.

Figure 10:
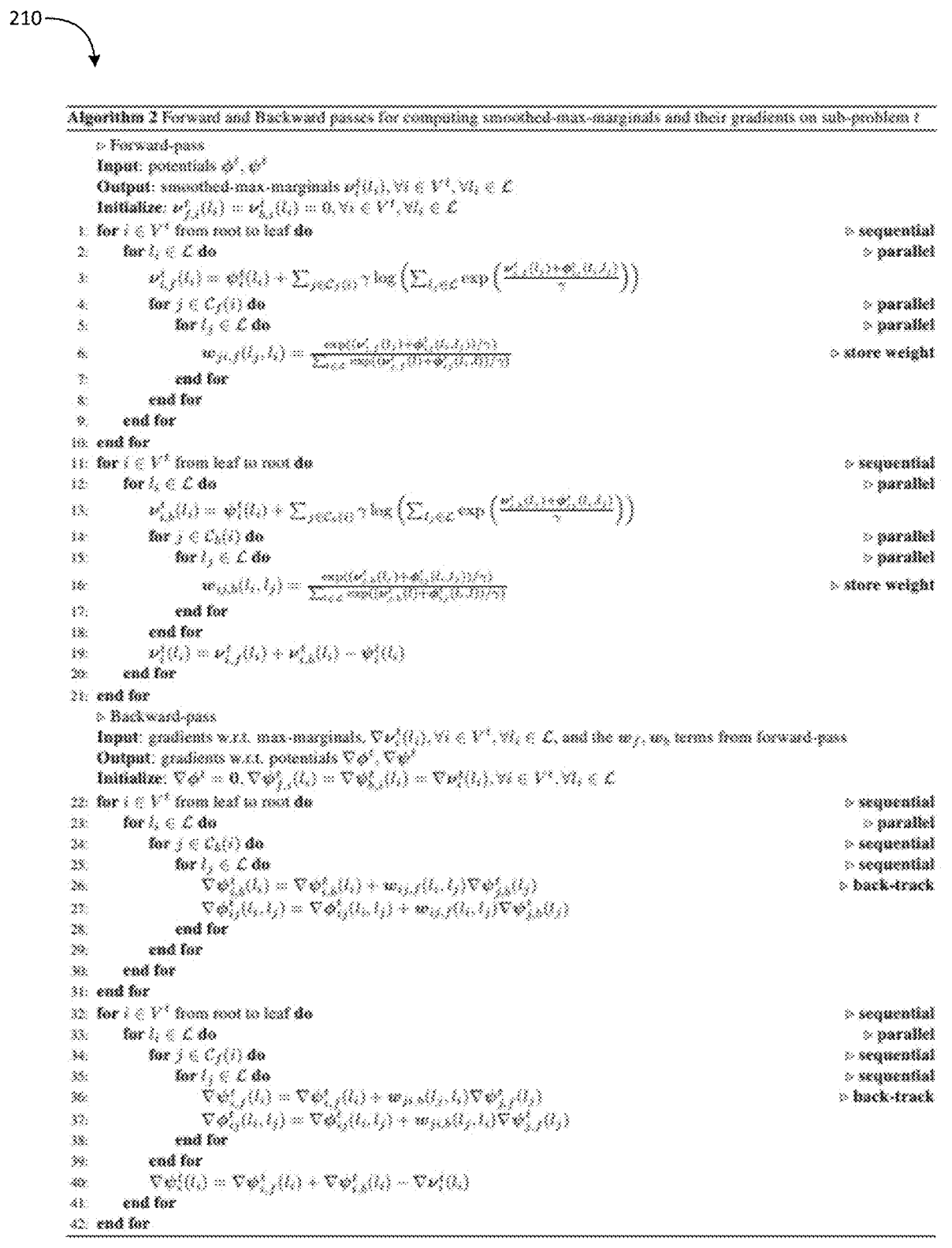
Figure 11:
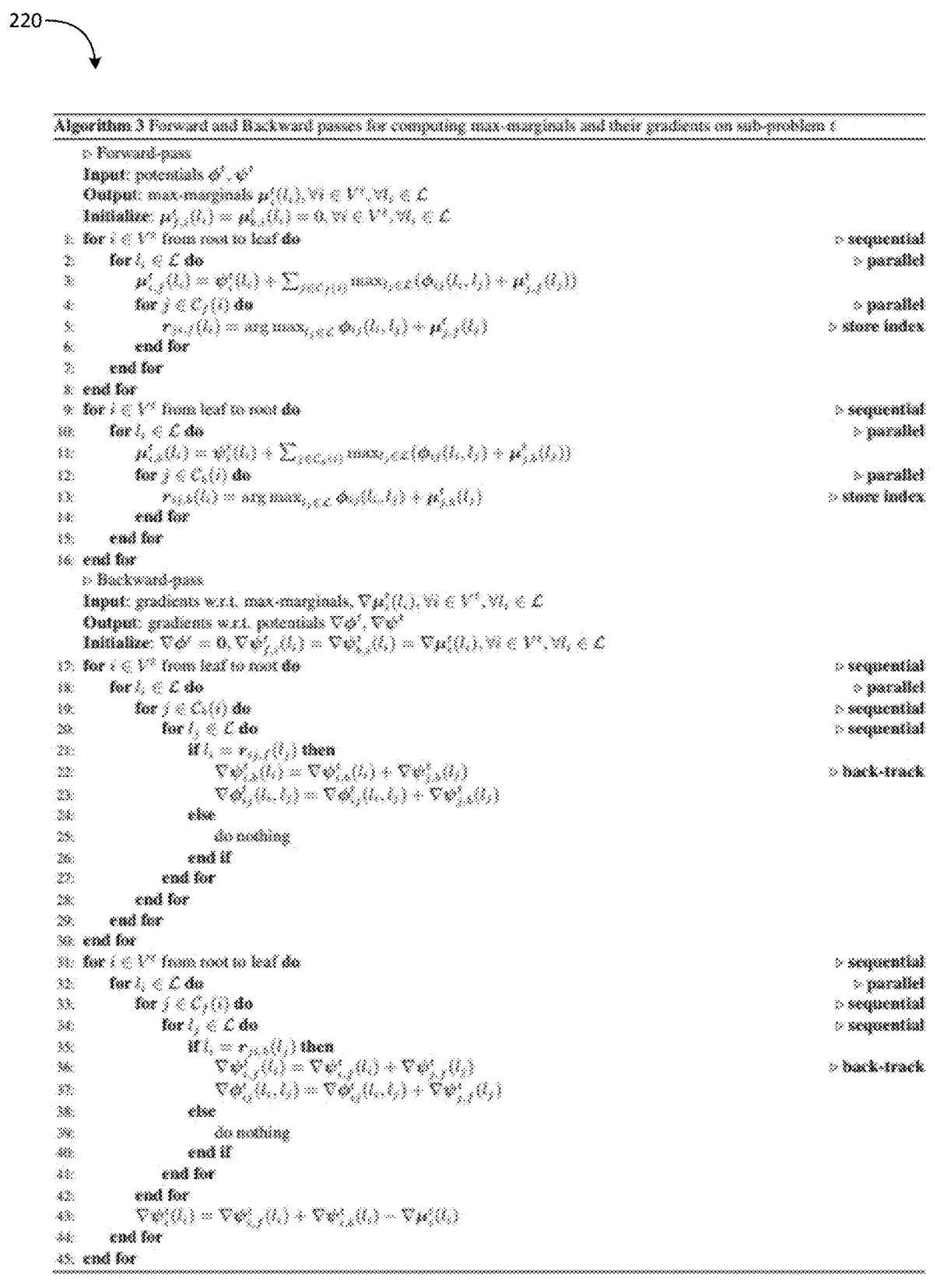

It should be understood that dynamic programming from root to leaf is known as forward dynamic programming and denoted by a subscript $f$ while dynamic programming from leaf to root is known as backward dynamic programming and denoted by a subscript b. In this context, $C_f(i)$ denotes a set of previous node(s) of node i in a root-leaf direction, while $C_b(i)$ denotes a set of previous node(s) of node i in a leaf-root direction. FIGS. 10 and 11 respectively illustrate algorithms for implementing forward and backward passes for determining smoothed-max-marginals and their gradients and max-marginals and their gradients.

Training, testing, and results of the system 10 will now be described in greater detail in relation to FIGS. 12 and 13. As mentioned above, the system 10 can execute semantic image segmentation utilizing the PASCAL VOC dataset.

Figure 12:
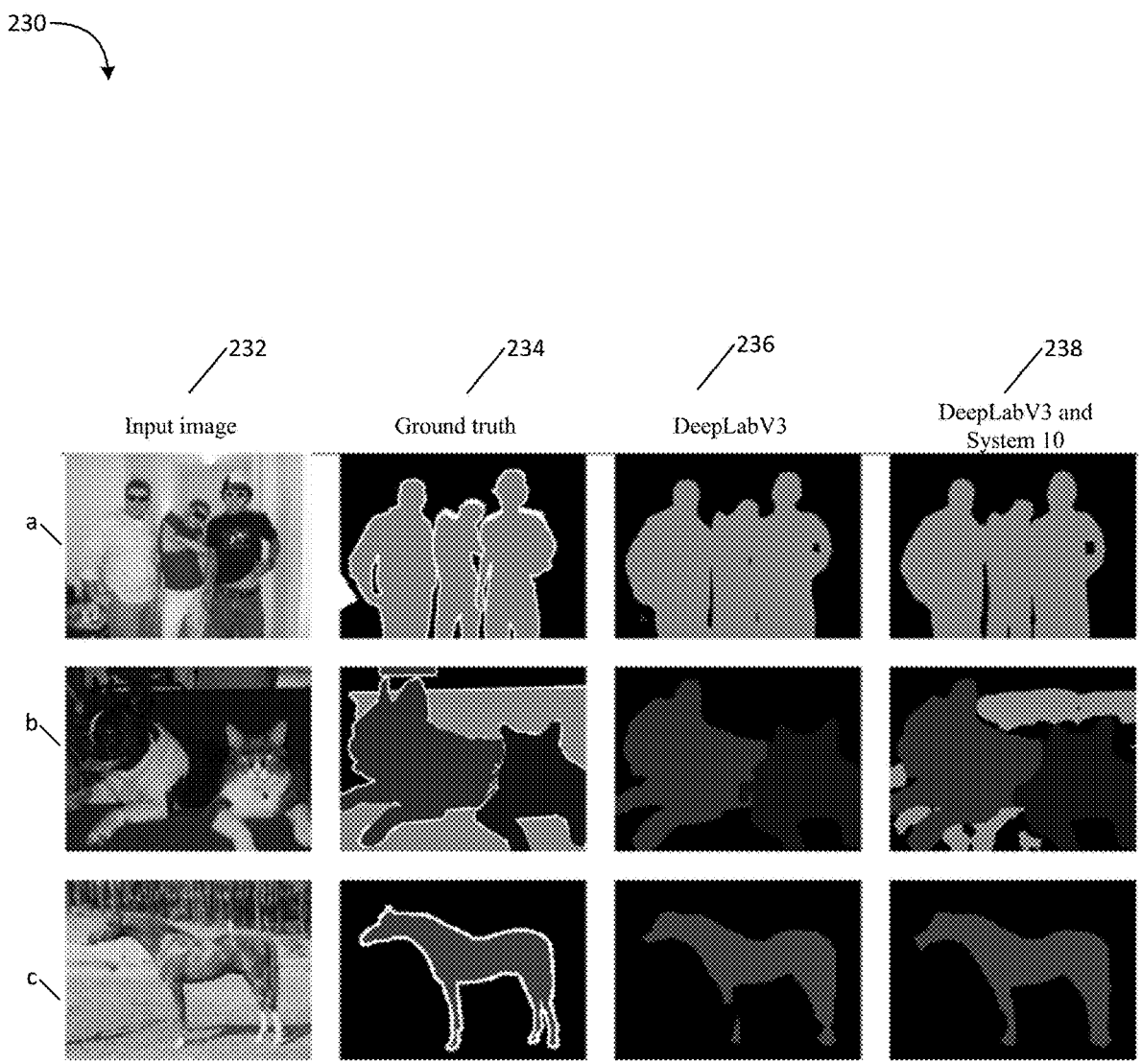
FIG. 12 is a compilation of images illustrating processing steps carried out by the system of the present disclosure.

FIG. 12 is a compilation of images 230 illustrating processing carried out by the system 10 of the present disclosure for semantic image segmentation. In particular, FIG. 12 illustrates input images 232*a-c*, ground truth images 234*a-c* and a qualitative comparison of DeepLabV3 images 236*a-c* and DeepLabV3 and system 10 combination images 238*a-c* with Xception-65 backbone. Rows a, b and c are respectively indicative of a crowded scene, inter-class contextual information and intra-class contextual information. As shown in FIG. 12, the CRF model and optimization provided by the system 10 yields a more refined boundary in image 238*a* compared to image 236*a* and encodes the inter-class contextual information of image 238*b* and the intra-class contextual information of image 238*c* to boost the weak unary classifier.

As mentioned above, the system 10 utilizes the PASCAL VOC 2012 semantic segmentation benchmark and average pixel intersection-over-union (mIoU) of the foreground as a performance measure. The PASCAL VOC dataset is widely utilized to benchmark various computer vision tasks such as object detection and semantic image segmentation. The semantic image segmentation benchmark includes 21 classes including a background class. The training dataset includes 1,464 images, the validation dataset includes 1,449 images and the testing dataset includes 1,456 images with pixel-wise semantic labeling. The system 10 utilizes additional annotations provided by the Semantics Boundaries Dataset (SBD) to augment the original PASCAL VOC 2012 training dataset thereby yielding an augmented training dataset including 10,582 images. The system 10 trains the network 14 on the augmented training dataset and evaluates a performance of the network on the validation dataset.

The system 10 re-implements DeepLabV3 in PyTorch with a block4-backbone (e.g., no additional block following the backbone except for one 1×1 convolution, two 3×3 convolutions and a final 1×1 convolution for classification) and Atrous Spatial Pyramid Pooling (ASPP) as a baseline. The system 10 sets the output stride to 16 for all models. The system 10 utilizes the Residual Neural Network 50 (ResNet-50) and Xception-65 as the backbones. To train the models, the system 10 utilizes a stochastic gradient descent (SGD) optimizer with a momentum of 0.9 and a "poly" learning rate policy with an initial learning rate of 0.007 for 30k steps. Additionally, the system 10 utilizes a weight decay of 0.00001 to train the ResNet-50 models and a weight decay of 0.00004 to train the Xception-65 models. With respect to data augmentation, the system 10 applies random color jittering, random scaling from 0.5 to 1.5, random horizontal flip, random rotation between −10° and 10°, and a randomly cropped 513×513 image patch of the transformed image. The system 10 also utilizes synchronized batch normalization with a batch size of 16 for all models which is the standard for training semantic segmentation models. With respect to the dual-composition augmented models, the system 10 obtains the pairwise potentials by applying a fully connected layer over concatenated features of pairs of locations on the feature map before the final layer of the baseline model, executes several steps of the fixed-point iteration (FPI) of Algorithm 1 utilizing output logits from unary and pairwise heads for each of training and inference, and maintains remaining configurations consistent with the baseline model.

FIG. 13 is a table 250 illustrating quantitative processing results based on different network models on the PASCAL VOC validation dataset. As shown in FIG. 13, the backbone can be augmented with at least one of a predetermined number of iterations of the FPI and/or the ASPP. The "#+Params" denotes a number of new parameters other than those in the backbone. The system 10 improves a performance of the baseline model when augmenting the baseline model with 15 iterations of the FPI and realizes 50% of the improvement of the ASPP while introducing approximately 2% additional parameters compared to that of the ASPP. The system 10 also improves the models augmented with ASPP when applying the FPI on top of the ASPP module. In particular, the system 10 respectively improves an mIOU of the ResNet-50 and Xeception-65 models by 0.6% and 0.2% when applying the FPI on top of the ASPP. It should be understood that the FPI operates directly on the output potentials/logits of the CNN rather than the features thereof and works in a parameter free manner such that the additional parameters originate from computing the pairwise potentials which are inputs to the FPI.

As described above, the system 10 utilizes a fixed-point algorithm having dual-monotonicity and dual-differentiability and provides an efficient and highly parallel graphics processing unit implementation for the algorithm. In particular, a smoothed-max operator with negative-entropy regularization provides for the fixed-point algorithm to be fully-differentiable while remaining monotone for the dual objective. Additionally, the system 10 can perform end-to-end training of CNNs and CRFs by differentiating through dual-composition layers thereby improving semantic segmentation accuracy on the PASCAL VOC 2012 dataset over baseline models. It should be understood that additional testing of the system 10 can be performed on other datasets and architectures, and tasks such as human-pose-estimation and stereo matching (which can be formulated as general CRF inference problems) in comparison to other models. It should be understood that certain modifications of the system 10 can include unsupervised/semi-supervised learning by enforcing an agreement of sub-problems.

Figure 14:
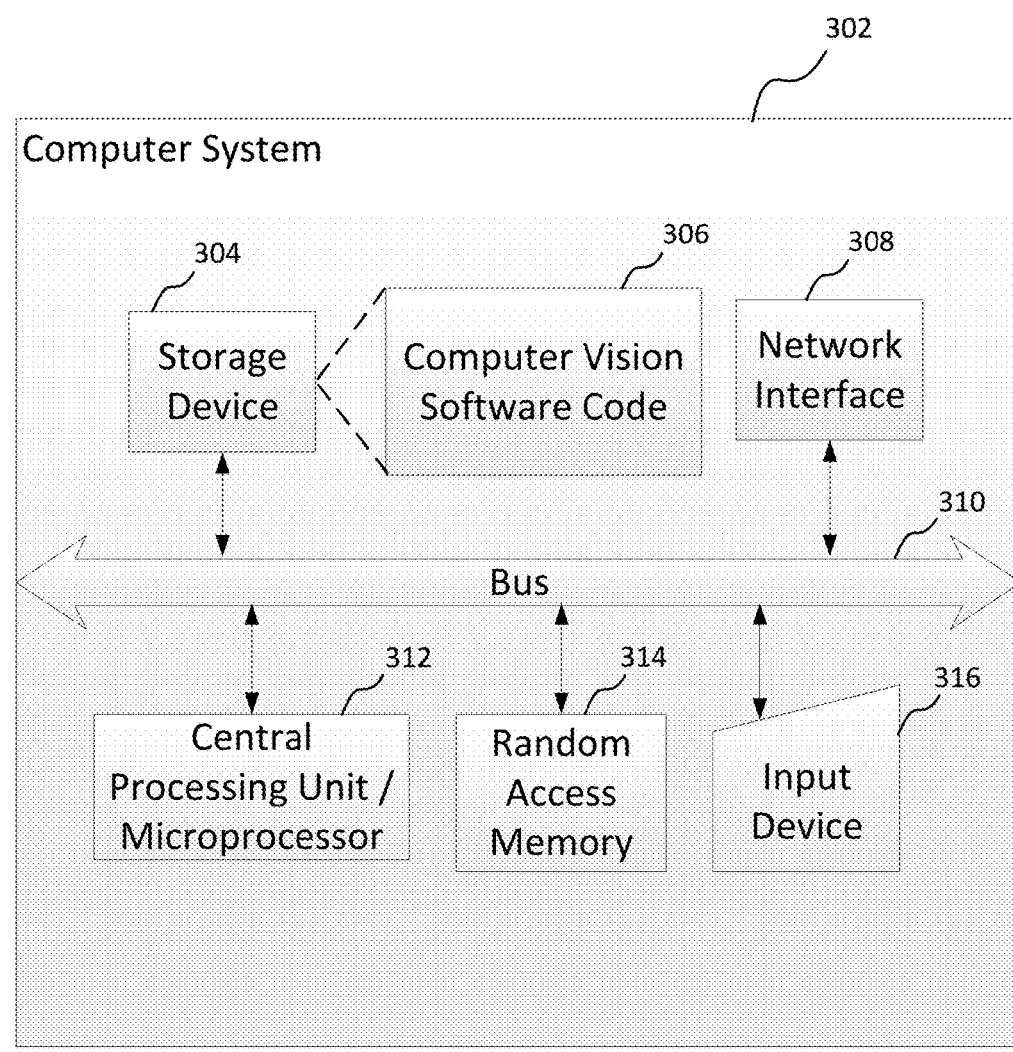
FIG. 14 is a diagram illustrating hardware and software components capable of being utilized to implement an embodiment of the system of the present disclosure.

FIG. 14 is a diagram 300 showing hardware and software components of a computer system 302 on which the system of the present disclosure can be implemented. The computer system 302 can include a storage device 304, computer vision software code 306, a network interface 308, a communications bus 310, a central processing unit (CPU) (microprocessor) 312, a random access memory (RAM) 314, and one or more input devices 316, such as a keyboard, mouse, etc. It is noted that the CPU 312 could also be one or more graphics processing units (GPUs). The server 302 could also include a display (e.g., liquid crystal display (LCD), cathode ray tube (CRT), etc.). The storage device 304 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 302 could be a networked computer system, a personal computer, a server, a smart phone, tablet computer etc. It is noted that the server 202 need not be a networked server, and indeed, could be a stand-alone computer system.

The functionality provided by the present disclosure could be provided by computer vision software code 306, which could be embodied as computer-readable program code stored on the storage device 304 and executed by the CPU 312 using any suitable, high or low level computing language, such as Python, Java, C, C++, C#, .NET, MATLAB, etc. The network interface 308 could include an Ethernet network interface device, a wireless network interface device, or any other suitable device which permits the server 302 to communicate via the network. The CPU 312 could include any suitable single-core or multiple-core microprocessor of any suitable architecture that is capable of implementing and running the computer software code 306 (e.g., Intel processor). The random access memory 314 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for end-to-end training of a neural network, comprising:
　a memory; and
　a processor in communication with the memory, the processor:
　　implementing a fixed point algorithm for dual-decomposition of a maximum-a-posteriori inference problem,
　　training a neural network to perform semantic image segmentation by applying the fixed point algorithm to training input data, and
　　processing one or more images to segment an attribute of the one or more images using the trained neural network.

2. The computer vision system of claim 1, wherein the fixed point algorithm is dual-monotone and sub-differentiable.

3. The computer vision system of claim 1, wherein the processor executes a parallel dynamic programming layer to implement the fixed point algorithm.

4. The computer vision system of claim 1, wherein the processor:
　determines a smoothed-max operator with negative entropy regularization, the smoothed-max operator rendering the fixed point algorithm fully differentiable, and
　executes a parallel dynamic programming layer to implement the fully differentiable fixed point algorithm.

5. The computer vision system of claim 4, wherein the processor:
　determines a forward pass of the smoothed-max operator, and determines a gradient of the forward pass of the smoothed-max operator.

6. The computer vision system of claim 1, wherein the processor implements the fixed point algorithm by:
defining a graph with vertices denoting a two-dimensional grid to determine the maximum-a-posteriori inference problem on a Markov random field,
transforming the maximum-a-posteriori inference problem to an integer linear programming problem, and
decomposing the graph having vertical and horizontal connections of arbitrary length into sets of horizontal and vertical chain sub-problems.

7. A computer vision method for end-to-end training of a neural network, comprising the steps of:
implementing a fixed point algorithm for dual-decomposition of a maximum-a-posteriori inference problem;
training a neural network to perform semantic image segmentation by applying the fixed point algorithm to training input data; and
processing one or more images using the trained neural network to segment an attribute of the one or more images.

8. The method of claim 7, wherein the fixed point algorithm is dual-monotone and sub-differentiable.

9. The method of claim 7, wherein the processor executes a parallel dynamic programming layer to implement the fixed point algorithm.

10. The method of claim 7, further comprising:
determining a smoothed-max operator with negative entropy regularization, the smoothed-max operator rendering the fixed point algorithm fully differentiable, and
executing a parallel dynamic programming layer to implement the fully differentiable fixed point algorithm.

11. The method of claim 10, further comprising:
determining a forward pass of the smoothed-max operator, and
determining a gradient of the forward pass of the smoothed-max operator.

12. The method of claim 7, further comprising:
defining a graph with vertices denoting a two-dimensional grid to determine the maximum-a-posteriori inference problem on a Markov random field,
transforming the maximum-a-posteriori inference problem to an integer linear programming problem, and
decomposing the graph having vertical and horizontal connections of arbitrary length into sets of horizontal and vertical chain sub-problems.

13. A non-transitory computer readable medium having instructions stored thereon for end-to-end training of a neural network which, when executed by a processor, causes the processor to carry out the steps of:
implementing a fixed point algorithm for dual-decomposition of a maximum-a-posteriori inference problem;
training a neural network to perform semantic image segmentation by applying the fixed point algorithm to training input data; and
processing one or more images using the trained neural network to segment an attribute of the one or more images.

14. The non-transitory computer readable medium of claim 13, wherein the fixed point algorithm is dual-monotone and sub-differentiable.

15. The non-transitory computer readable medium of claim 13, further comprising the step of executing a parallel dynamic programming layer to implement the fixed point algorithm.

16. The non-transitory computer readable medium of claim 13, further comprising the steps of:
determining a smoothed-max operator with negative entropy regularization, the smoothed-max operator rendering the fixed point algorithm fully differentiable, and
executing a parallel dynamic programming layer to implement the fully differentiable fixed point algorithm.

17. The non-transitory computer readable medium of claim 16, further comprising the steps of:
determining a forward pass of the smoothed-max operator, and
determining a gradient of the forward pass of the smoothed-max operator.

18. The non-transitory compute readable medium of claim 13, further comprising the steps of:
defining a graph with vertices denoting a two-dimensional grid to determine the maximum-a-posteriori inference problem on a Markov random field,
transforming the maximum-a-posteriori inference problem to an integer linear programming problem, and
decomposing the graph having vertical and horizontal connections of arbitrary length into sets of horizontal and vertical chain sub-problems.

* * * * *

UNITED STATES PATENT AND TRADEMARK OFFICE
CERTIFICATE OF CORRECTION

| | | |
|---|---|---|
| PATENT NO. | : 12,106,481 B2 | Page 1 of 1 |
| APPLICATION NO. | : 17/121257 | |
| DATED | : October 1, 2024 | |
| INVENTOR(S) | : Shaofei Wang et al. | |

It is certified that error appears in the above-identified patent and that said Letters Patent is hereby corrected as shown below:

In the Claims

In Column 22, Claim 18, Line 37, the word "compute" should be deleted and replaced with the word "computer".

Signed and Sealed this
Twenty-ninth Day of April, 2025

Coke Morgan Stewart
*Acting Director of the United States Patent and Trademark Office*